US006975267B2

(12) United States Patent

Stenger et al.

(10) Patent No.: US 6,975,267 B2

(45) Date of Patent: Dec. 13, 2005

(54) LOW PROFILE ACTIVE ELECTRONICALLY SCANNED ANTENNA (AESA) FOR KA-BAND RADAR SYSTEMS

(75) Inventors: Peter A. Stenger, Woodbine, MD (US); Fred C. Kuss, Elkridge, MD (US); Kevin LaCour, Laurel, MD (US); Craig Heffner, Ellicott City, MD (US); Robert Sisk, Annapolis, MD (US); Carl D. Wise, Severna Park, MD (US); Joseph Paquin, Columbia, MD (US); Tujuana Hinton, Baltimore, MD (US); Andrew Walters, Elkridge, MD (US); David Krafcsik, Crownsville, MD (US); Brian T. McMonagle, Woodstock, MD (US); Steven D. Block, Pikesville, MD (US); Steven S. Handley, Severna Park, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 119 days.

(21) Appl. No.: 10/358,278

(22) Filed: Feb. 5, 2003

(65) Prior Publication Data

US 2004/0150554 A1 Aug. 5, 2004

(51) Int. Cl.[7] .......................... H01Q 3/22; H01Q 3/24; H01Q 3/26; G01S 13/00

(52) U.S. Cl. ...................... 342/371; 342/147; 342/157; 342/175; 342/368; 342/372

(58) Field of Search .................... 342/74–81, 147–158, 342/175, 195, 368–377; 343/700 MS, 725–730, 343/753–757, 762, 767–786, 824–831, 844, 343/850, 853, 855, 857, 858, 872, 873, 893, 343/904–916; 361/274.3; 174/16.3; 228/222; 439/487; 257/678, 685, 686, 690–701, 706, 257/707, 712, 720, 728, 730–733; 333/202, 333/204

(56) References Cited

U.S. PATENT DOCUMENTS

| | | | | | |
|---|---|---|---|---|---|
| 4,490,723 | A | * | 12/1984 | Hardie et al. | 343/754 |
| 4,903,033 | A | * | 2/1990 | Tsao et al. | 343/700 MS |
| 5,087,922 | A | * | 2/1992 | Tang et al. | 343/853 |
| 5,153,600 | A | * | 10/1992 | Metzler et al. | 343/700 MS |
| 5,206,655 | A | * | 4/1993 | Caille et al. | 343/700 MS |
| 5,223,850 | A | * | 6/1993 | Branigan et al. | 343/771 |
| 5,262,791 | A | * | 11/1993 | Tsuda et al. | 343/700 MS |
| 5,327,152 | A | | 7/1994 | Kruger et al. | |
| 5,404,145 | A | * | 4/1995 | Sa et al. | 343/700 MS |
| 5,414,434 | A | * | 5/1995 | Conant et al. | 343/700 MS |
| 5,841,401 | A | * | 11/1998 | Bodley et al. | 343/700 MS |
| 5,874,919 | A | * | 2/1999 | Rawnick et al. | 343/700 MS |
| 6,020,799 | A | * | 2/2000 | Ishizaki et al. | 333/204 |
| 6,239,762 | B1 | * | 5/2001 | Lier | 343/770 |
| 6,297,774 | B1 | * | 10/2001 | Chung | 343/776 |
| 6,320,547 | B1 | | 11/2001 | Fathy et al. | |
| 6,639,558 | B2 | * | 10/2003 | Kellerman et al. | 343/700 MS |
| 6,653,985 | B2 | * | 11/2003 | Sikina et al. | 343/853 |
| 6,717,549 | B2 | * | 4/2004 | Rawnick et al. | 343/700 MS |

FOREIGN PATENT DOCUMENTS

EP 0 893 642 A1 1/1999

OTHER PUBLICATIONS

"The Westinghouse High Density Microwave Packaging Program", J.A. Costello et al., Microwave Symposium Digest, 1995, pp. 177-180.

"EHF Monolithic Phased Arrays-a Stepping-Stone to the Future", McIlvenna et al., IEEE, Oct. 23, 1988, pp. 0731-0735.

"A Hybrid Tile Approach for Ka Band Subarray Modules", Shashi Sanzgiri et al., IEEE Inc., New York, vol. 43, No. 9, pp. 953-959.

* cited by examiner

*Primary Examiner*—Bernarr E. Gregory

(74) *Attorney, Agent, or Firm*—Birch, Stewart, Kolasch & Birch, LLP

(57) ABSTRACT

A vertically integrated Ka-band active electronically scanned antenna including, among other things, a transitioning RF waveguide relocator panel located behind a radiator faceplate and an array of beam control tiles respectively coupled to one of a plurality of transceiver modules via an RF manifold. Each of the beam control tiles includes a respective plurality of high power transmit/receive (T/R) cells as well as dielectric waveguides, RF stripline and coaxial transmission line elements. The waveguide relocator panel is preferably fabricated by a diffusion bonded copper laminate stack up with dielectric filling. The beam control tiles are preferably fabricated by the use of multiple layers of low temperature co-fired ceramic (LTCC) material laminated together. The waveguide relocator panel and the beam control tiles are designed to route RF signals to and from a respective transceiver module of four transceiver modules and a quadrature array of antenna radiators matched to free space formed in the faceplate. Planar type metal spring gaskets are provided between the interfacing layers so as to provide and ensure interconnection between mutually facing waveguide ports and to prevent RF leakage from around the perimeter of the waveguide ports. Cooling of the various components is achieved by a pair of planar forced air heat sink members which are located on either side of the array of beam control tiles. DC power and control of the T/R cells is provided by a printed circuit wiring board assembly located adjacent to the array of beam controlled tiles with solderless DC connections being provided by an arrangement of "fuzz button" electrical connector elements.

72 Claims, 29 Drawing Sheets

FIG. 5A
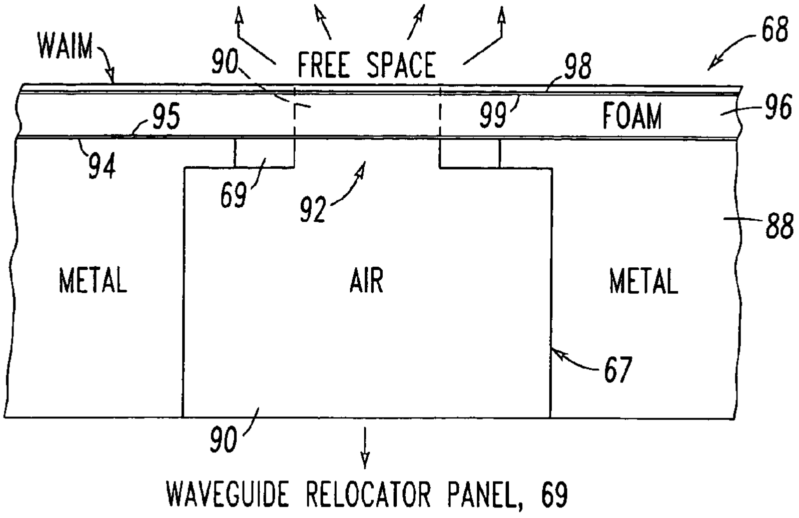
FIG. 5B
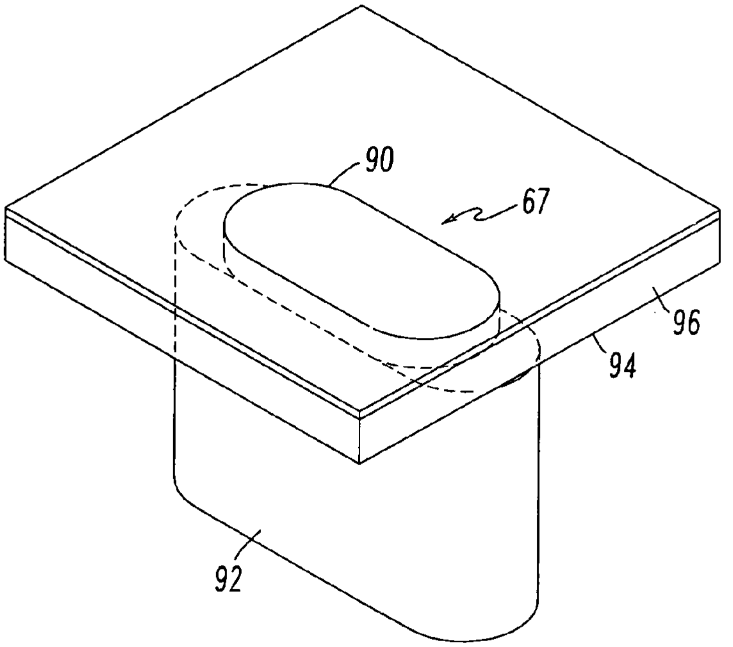
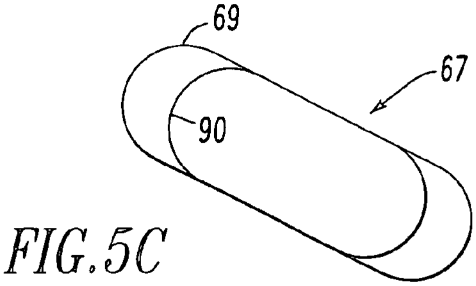
FIG. 5C

FIG. 16
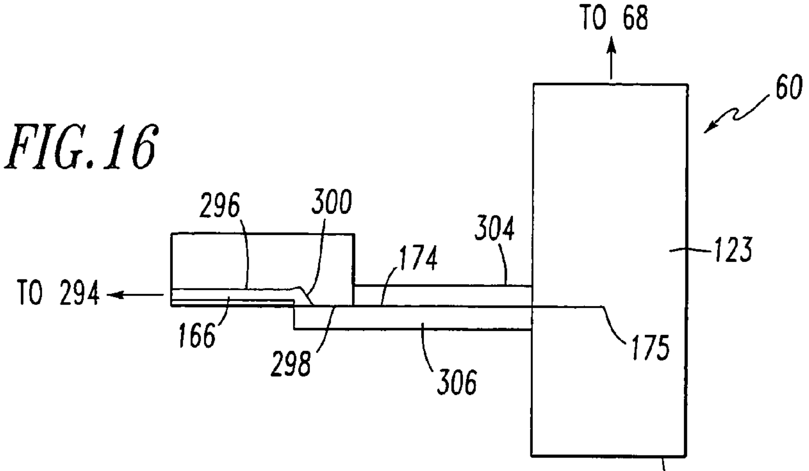
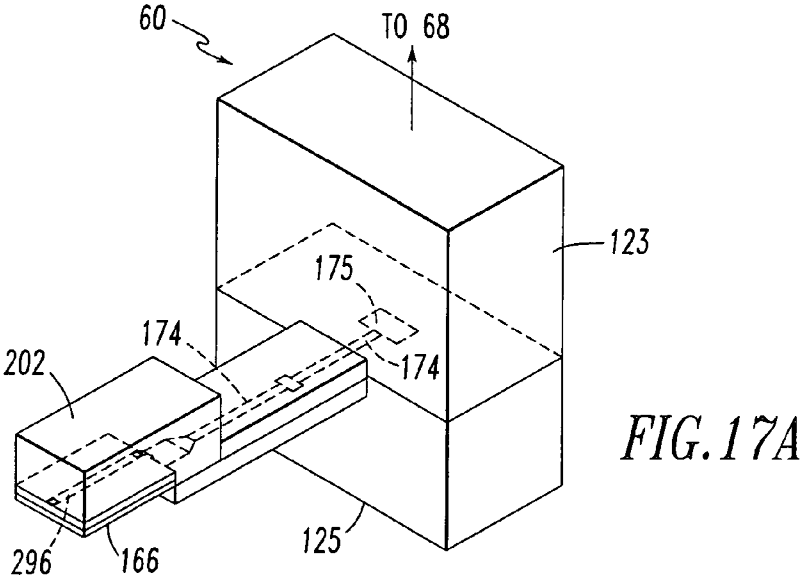
FIG. 17A
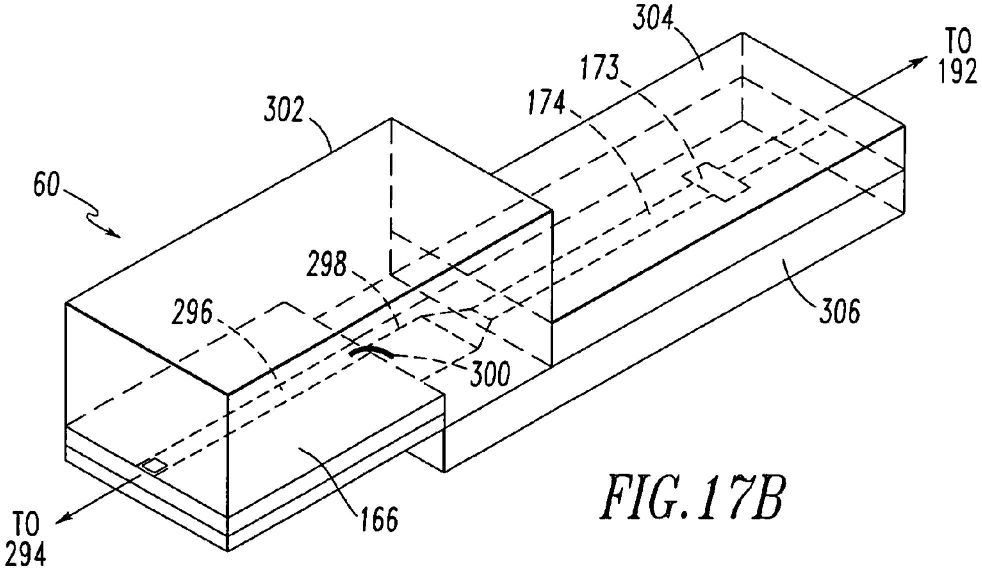
FIG. 17B

FIG.27A
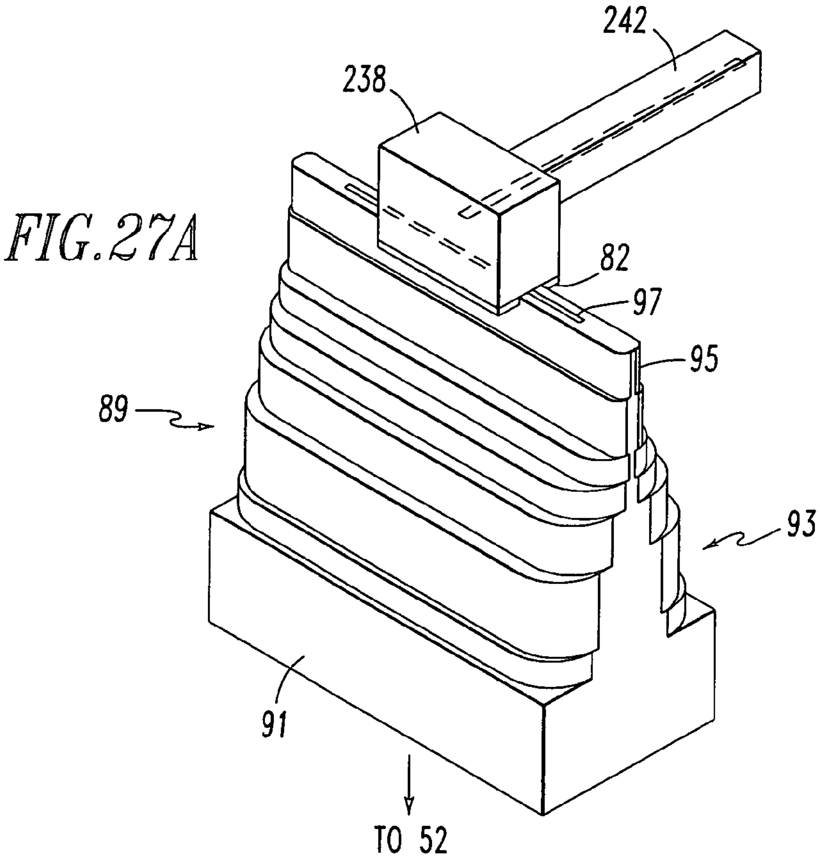
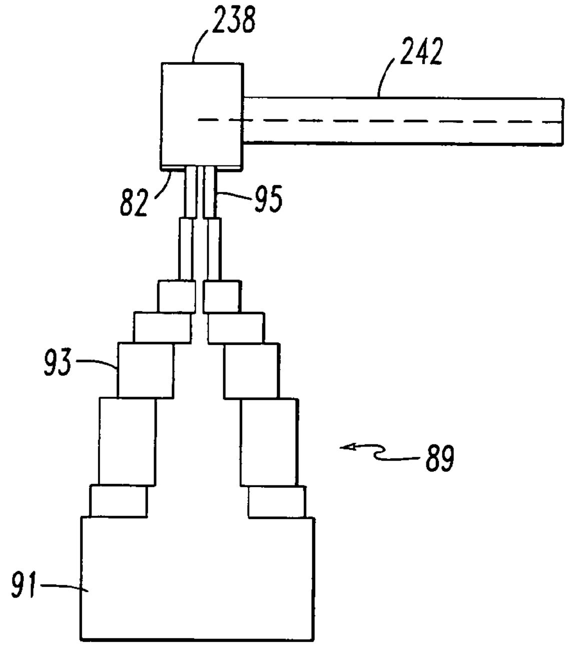
FIG.27B

LOW PROFILE ACTIVE ELECTRONICALLY SCANNED ANTENNA (AESA) FOR KA-BAND RADAR SYSTEMS

BACKGROUND OF THE INVENTION

This invention relates generally to radar and communication systems and more particularly to an active phased array radar system operating in the Ka-band above 30 GHz.

Active electronically scanned antenna (AESA) arrays are generally well known. Such apparatus typically requires amplifier and phase shifter electronics that are spaced every half wavelength in a two dimensional array. Known prior art AESA systems have been developed at 10 GHz and below, and in such systems, array element spacing is greater than 0.8 inches and provides sufficient area for the array electronics to be laid out on a single circuit layer. However, at Ka-band (>30 GHz), element spacing must be in the order of 0.2 inches or less, which is less than 1⁄10 of the area of an array operating at 10 GHz.

Accordingly, previous attempts to design low profile electronically scanned antenna arrays for ground and air vehicles and operating at Ka-band have experienced what appears to be insurmountable difficulties because of the small element spacing requirements. A formidable problem also encountered was the extraction of heat from high power electronic devices that would be included in the circuits of such a high density array. For example, transmit amplifiers of transmit/receive (T/R) circuits in such systems generate large amounts of heat which much be dissipated so as to provide safe operating temperatures for the electronic devices utilized.

Because of the difficulties of the extremely small element spacing required for Ka-band operation, the present invention overcomes these inherent problems by “vertical integration” of the array electronics which is achieved by sandwiching multiple mutually parallel layers of circuit elements together against an antenna faceplate. By planarizing T/R channels, RF signal manifolds and heat sinks, the size and particularly the depth of the entire assembly can be significantly reduced while still providing the necessary cooling for safe and efficient operation.

SUMMARY

Accordingly, it is an object of the present invention to provide an improvement in high frequency phased array radar systems.

It is another object of the invention to provide an architecture for an active electronically scanned phased array radar system operating in the Ka-band of frequencies above 30 GHz.

It is yet another object of the invention to provide an active electronically scanned phased array Ka-band radar system having a multi-function capability for use with both ground and air vehicles.

These and other objects are achieved by an architecture for a Ka-band multi-function radar system (KAMS) comprised of multiple parallel layers of electronics circuitry and waveguide components which are stacked together so as to form a unitary structure behind an antenna faceplate. The invention includes the concepts of vertical integration and solderless interconnects of active electronic circuits while maintaining the required array grid spacing for Ka-band operation and comprises, among other things, a transitioning RF waveguide relocator panel located behind a radiator faceplate and an array of beam control tiles respectively coupled to one of a plurality of transceiver modules via an RF manifold. Each of the beam control tiles includes respective high power transmit/receive (T/R) cells as well as RF stripline and coaxial transmission line elements. In the preferred embodiment of the invention, the waveguide relocator panel is comprised of a diffusion bonded copper laminate stack up with dielectric filling while the beam control tiles are fabricated by the use of multiple layers of low temperature co-fired ceramic (LTCC) material laminated together and designed to route RF signals to and from a respective transceiver module of four transceiver modules and a quadrature array of antenna radiators matched to free space formed in the faceplate. Planar type metal spring gaskets are provided between the interfacing layers so as to prevent RF leakage from around the perimeter of the waveguide ports of abutting layer members. Cooling of the various components is achieved by a pair of planar forced air heat sink members which are located on either side of the array of beam control tiles. DC power and control of the T/R cells is provided by a printed circuit wiring board assembly located adjacent to the array of beam controlled tiles with solderless DC connections being provided by an arrangement of “fuzz button” electrical connector elements. Alignments pins are provided at different levels of the planar layers to ensure that waveguide, electrical signals and power interface properly.

Further scope of applicability of the present invention will become apparent from the detailed description provided hereinafter. It should be understood, however, that the detailed description and specific example while indicating the preferred embodiment of the invention, it is provided by way of illustration only since various changes and modifications coming within the spirit and scope of the invention will become apparent to those skilled in the art from this detailed description.

BRIEF DESCRIPTION OF THE DRAWINGS

The present invention will become more fully understood when the detailed provided hereinafter is considered in connection with the accompanying drawings, which are provided by way of illustration only and are thus not meant to be considered in a limiting sense, and wherein:

FIGS. 5A–5C are diagrams illustrative of the details of the radiator elements in the faceplate shown in FIG. 4;

FIG. 16 is a side plan view illustrative of an RF transition element from a T/R cell such as shown in FIG. 15 to a waveguide in the beam control tile shown in FIG. 14I;

FIGS. 17A and 17B are perspective views further illustrative of the RF transition element shown in FIG. 16;

FIGS. 27A and 27B are perspective and side elevational views illustrative of one of the RF transition elements located in the face of heat sink member shown in FIG. 26;

DETAILED DESCRIPTION OF THE INVENTION

Figure 1:
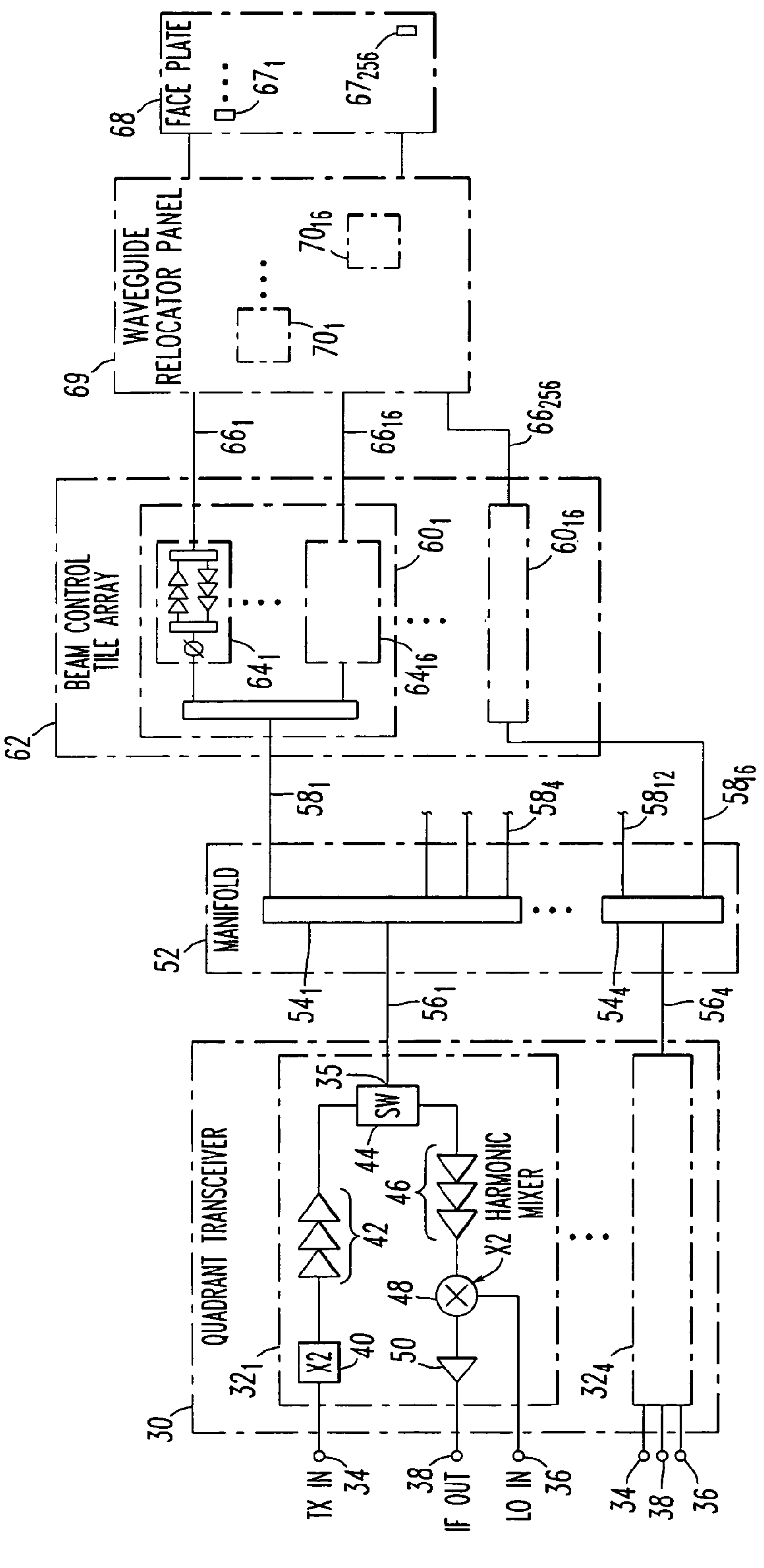
FIG. 1 is an electrical block diagram broadly illustrative of the subject invention.

Referring now to the various drawing figures wherein like reference numerals refer to like components throughout, reference is first made to FIG. 1 wherein there is shown an electrical block diagram broadly illustrative of the subject invention and which is directed to a Ka-band multi-function system (KAMS) active bidirectional electronically scanned antenna (AESA) array utilized for both transmitting and receiving RF signals to and from a target.

In FIG. 1, reference numeral 30 denotes a transceiver module sub-assembly comprised of four transceiver modules $\mathbf{32}_1 \ldots \mathbf{32}_4$, each including an input terminal 34 for RF signals to be transmitted, a local oscillator input terminal 36 and a receive IF output terminal 38. Each transceiver module, for example module $\mathbf{32}_1$, also includes a frequency doubler 40, transmit RF amplifier circuitry 42, and a transmit/receive (T/R) switch 44. Also included is receive RF amplifier circuitry 46 coupled to the T/R switch 44. The receive amplifier 46 is coupled to a second harmonic (X2) signal mixer 48 which is also coupled to a local oscillator input terminal 36. The output of the mixer 48 is connected to an IF amplifier circuit 50, whose output is coupled to the IF output terminal 38. The transmit RF signal applied to the input terminal 34 and the local oscillator input signal applied to the terminal 36 is generated externally of the system and the IF output signal is also utilized by well known external circuitry, not shown.

Figure 2:
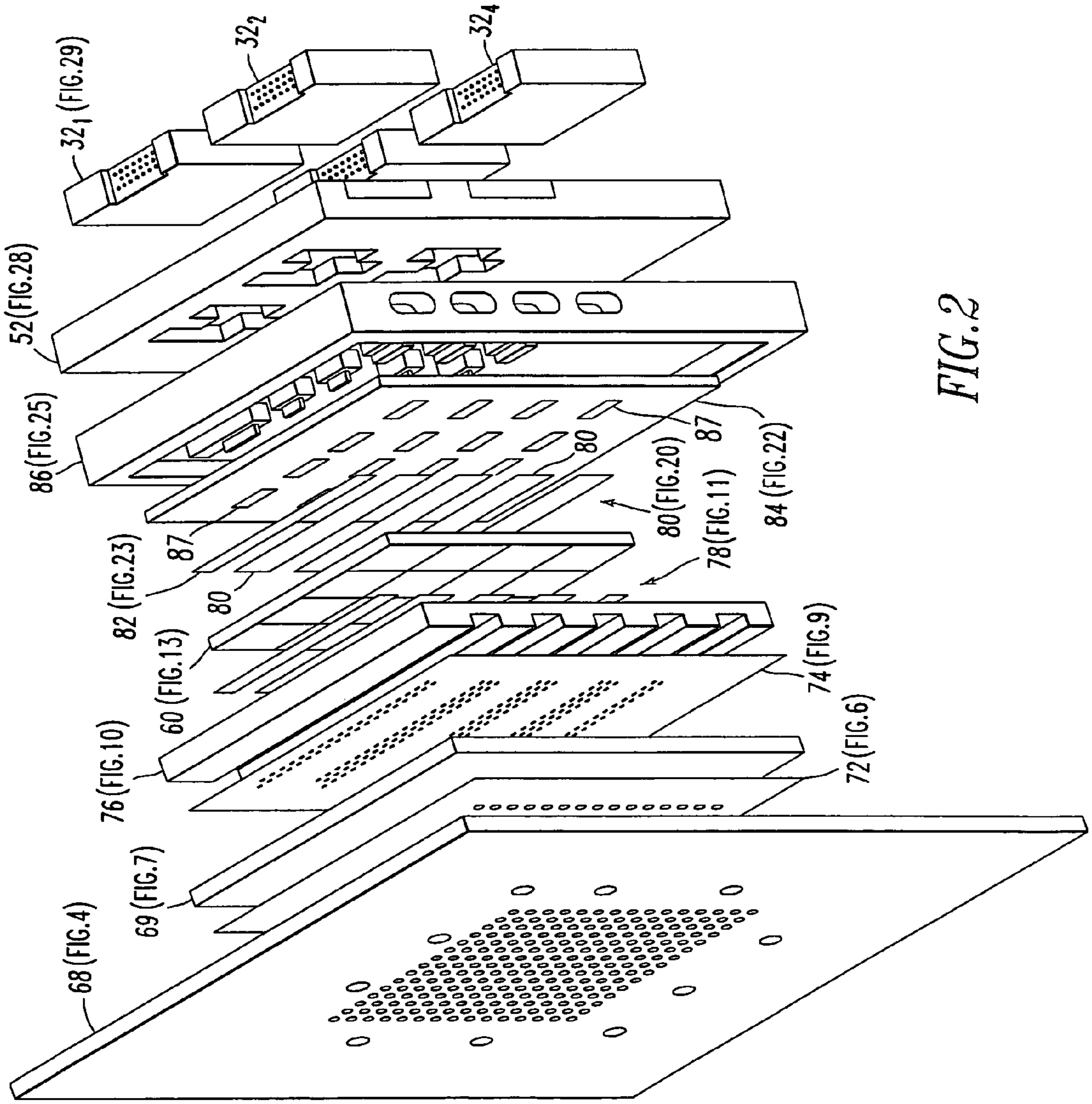
FIG. 2 is an exploded perspective view of the various planar type system components of the preferred embodiment of the invention.

The four transceiver modules $\mathbf{32}_1 \ldots \mathbf{32}_4$ of the transceiver module section 30 are coupled to an RF manifold sub-assembly 52 consisting of four manifold sections $\mathbf{54}_1 \ldots \mathbf{54}_4$, each comprised of a single port 56 coupled to a T/R switch 44 of a respective transceiver module 32 and four RF signal ports $\mathbf{58}_1 \ldots \mathbf{58}_4$ which are respectively coupled to one beam control tile 60 of a set 62 of sixteen identical beam control tiles $\mathbf{60}_1 \ldots \mathbf{60}_{16}$ arranged in a rectangular array, shown in FIG. 2.

Figure 7C:
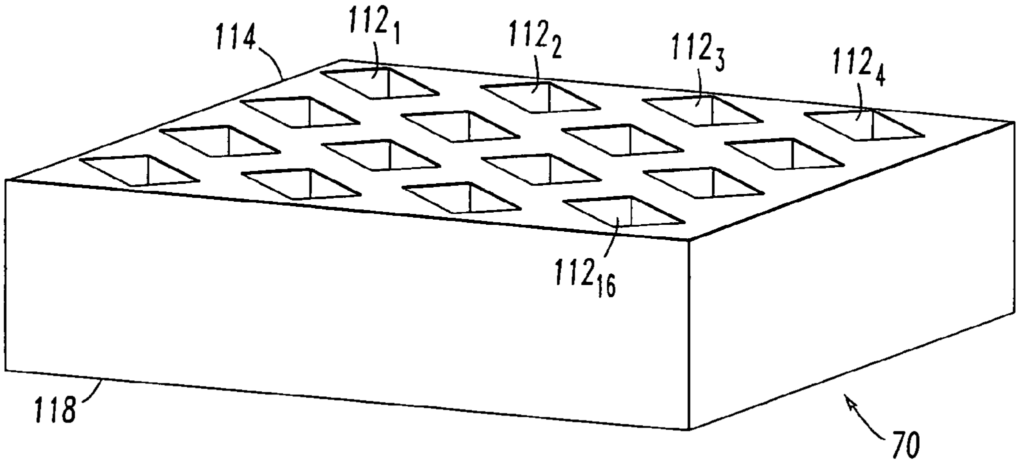
FIG. 7C is a perspective view of one of sixteen waveguide relocator sub-panel sections of the waveguide relocator panel shown in FIGS. 7A and 7B.
Figure 7A:
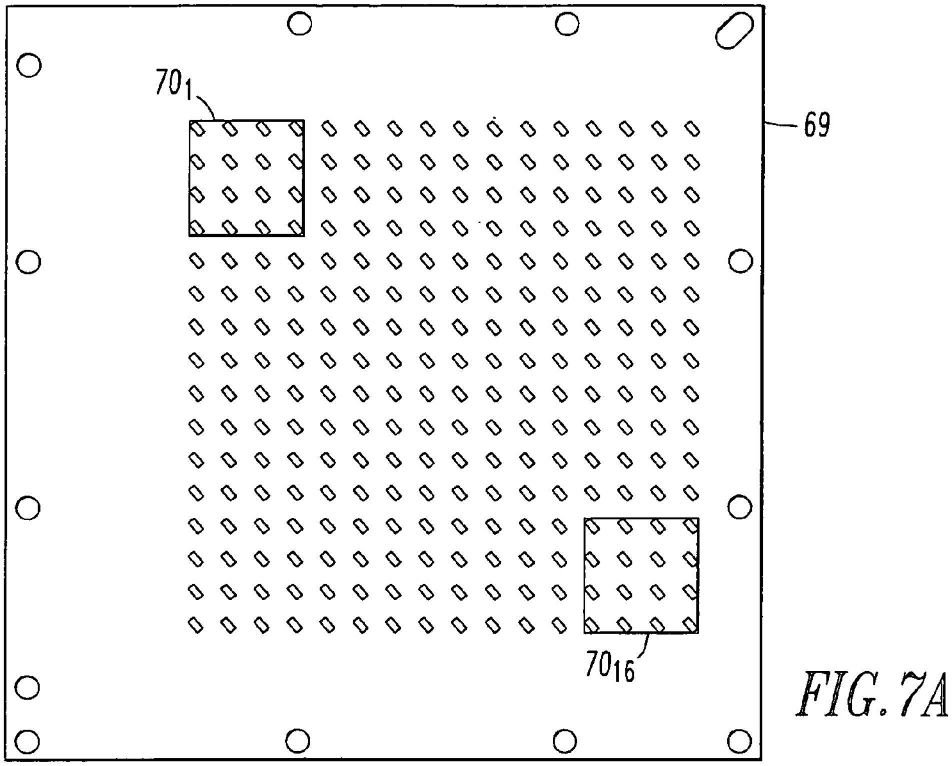
FIGS. 7A and 7B are plan views illustrative of the front and back faces of the waveguide relocator panel.
Figure 7B:
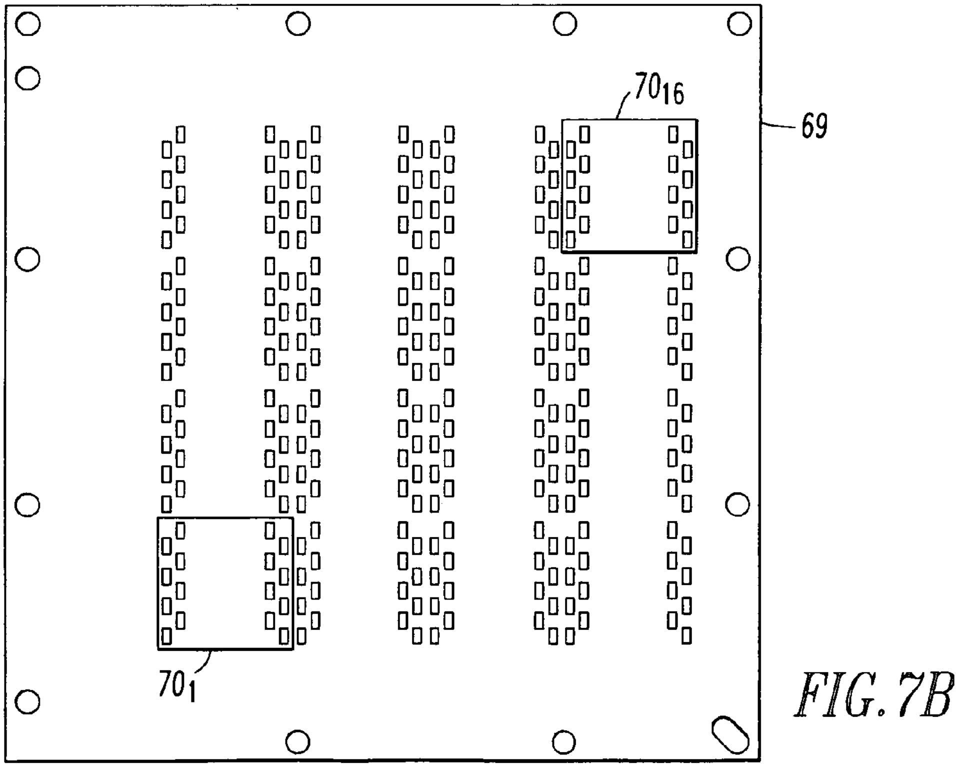

Each of the beam control tiles $\mathbf{60}_1 \ldots \mathbf{60}_{16}$ implements sixteen RF signal channels $\mathbf{64}_1 \ldots \mathbf{64}_{16}$ so as to provide an off-grid cluster of two hundred fifty-six waveguides $\mathbf{66}_1 \ldots \mathbf{66}_{256}$ which are fed to a grid of two hundred fifty-six radiator elements $\mathbf{67}_1 \ldots \mathbf{67}_{256}$ in the form of angulated slots matched to free space in a radiator faceplate 68 via sixteen waveguide relocator sub-panel sections $\mathbf{70}_1 \ldots \mathbf{70}_{16}$ of a waveguide relocator panel 69 shown in FIGS. 7A and 7B. The relocator panel 69 relocates the two hundred fifty six waveguides $\mathbf{66}_1 \ldots \mathbf{66}_{256}$ in the beam control tiles $\mathbf{64}_1 \ldots \mathbf{64}_{16}$ back on grid at the faceplate 68 and which operate as a quadrature array with the four transceiver modules $\mathbf{32}_1 \ldots \mathbf{32}_4$.

The architecture of the AESA system shown in FIG. 1 is further illustrated in FIG. 2 and comprises an exploded view of the multiple layers of planar components that are stacked together in a vertically integrated assembly with metal spring gasket members being sandwiched between interfacing layers or panels of components to ensure the electrical RF integrity of the waveguides $\mathbf{66}_1 \ldots \mathbf{66}_{256}$ through the assembly. In addition to the transceiver section 30, the manifold section 52, the beam control tile array 62, the waveguide relocator panel 69, and the faceplate 68 referred to in FIG. 1, the embodiment of the invention includes a first spring gasket member 72 fabricated from beryllium copper (Be—Cu) located between the antenna faceplate 68 and the waveguide relocator panel 69, a second Be—Cu spring gasket member 74 located between the waveguide relocator panel 69 and an outer heat sink member 76, a third set of Be—Cu spring gasket members 78$_1$ . . . 78$_5$ which are sandwiched between the array 62 of beam control tiles 60$_1$ . . . 60$_{16}$, and a fourth set of four Be—Cu spring gasket members 82$_1$ . . . 82$_4$ which are located beneath the beam control tile array 62 and a DC printed wiring board 84 which includes an assembly of DC fuzz button connector boards 80 mounted thereon. Beneath the printed wiring board 84 is an inner heat sink 86 and the RF manifold section 52 referred to above and which is followed by the transceiver module assembly 30 which is shown in FIG. 2 including one transceiver module 32$_1$, of four modules 32$_1$ . . . 32$_4$ shown in FIG. 1. When desirable, however, the antenna faceplate, the relocator panel, and outer heat could be fabricated as a single composite structure.

Figure 3:
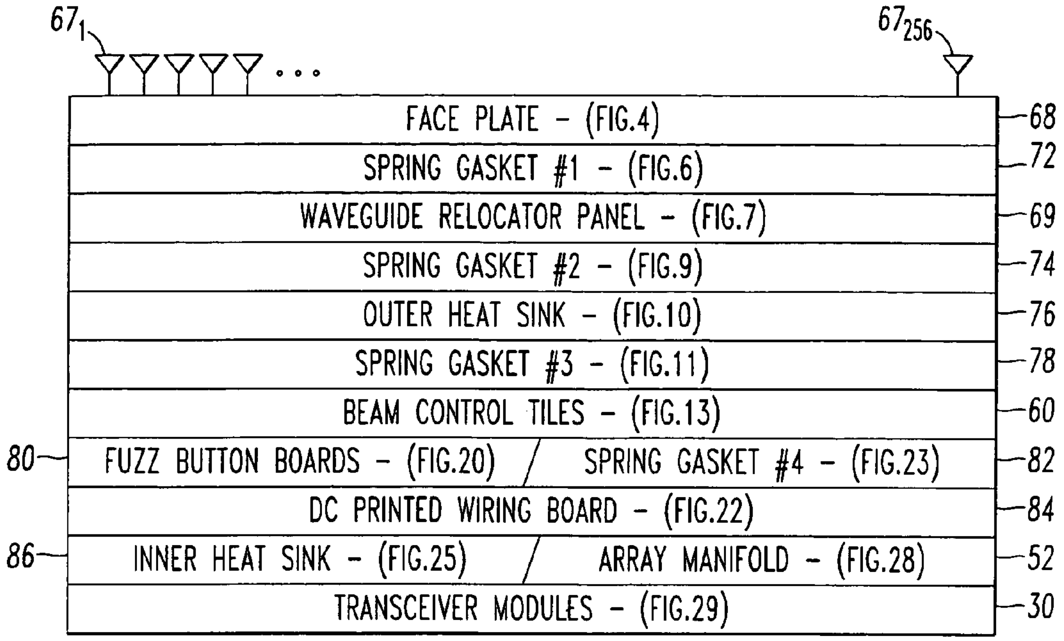
FIG. 3 is a simplified block diagram showing the relative positions of the system components included in the embodiment shown in FIG. 1.
Figure 4:
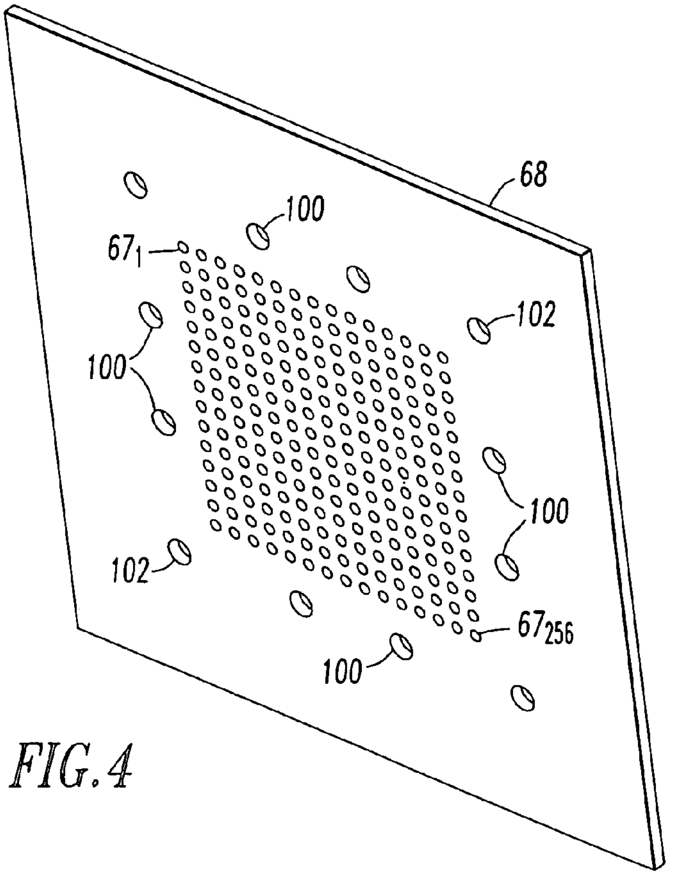
FIG. 4 is a perspective view illustrative of the antenna faceplate of the embodiment shown in FIG. 2.

The relative positions of the various components shown in FIG. 2 are further illustrated in block diagrammatic form in FIG. 3. In the diagram of FIG. 3, the fuzz button boards 80 and the fourth set of spring gasket members 82 are shown in a common block because they are placed in a coplanar sub-assembly between the array 62 of beam control tiles 60$_1$ . . . 60$_4$ and the inner heat sink 86. The inner heat sink 86 and the RF manifold 52 are shown in a common block of FIG. 3 because they are comprised of members which, as will be shown, are bonded together so as to form a composite mechanical sub-assembly.

Referring now to the details of the various components shown in FIG. 2, FIGS. 4 and 5A–5C are illustrative of the antenna faceplate 68 which consists of an aluminum alloy plate member 88 and which is machined to include a grid of two hundred fifty six radiator elements 67$_1$ . . . 67$_{256}$ which are matched to free space and comprise oblong slots having rounded end portions. As shown in FIGS. 5A and 5B, each radiator slot 67 includes an impedance matching step 90 in the width of the outer end portion 92. The outer surface 94 of the aluminum plate 88 includes a layer of foam material 96 which is covered by a layer of dielectric 98 that provides wide angle impedance matching (WAIM) to free space.

Dielectric adhesive layers 95 and 99 are used to bond the foam material 96 to the plate 88 and WAIM layer 98. Reference numerals 100 and 102 in FIG. 4 refer to a set of mounting and alignment holes located around the periphery of the grid of radiator elements 67$_1$ . . . 67$_{256}$.

Figure 6:
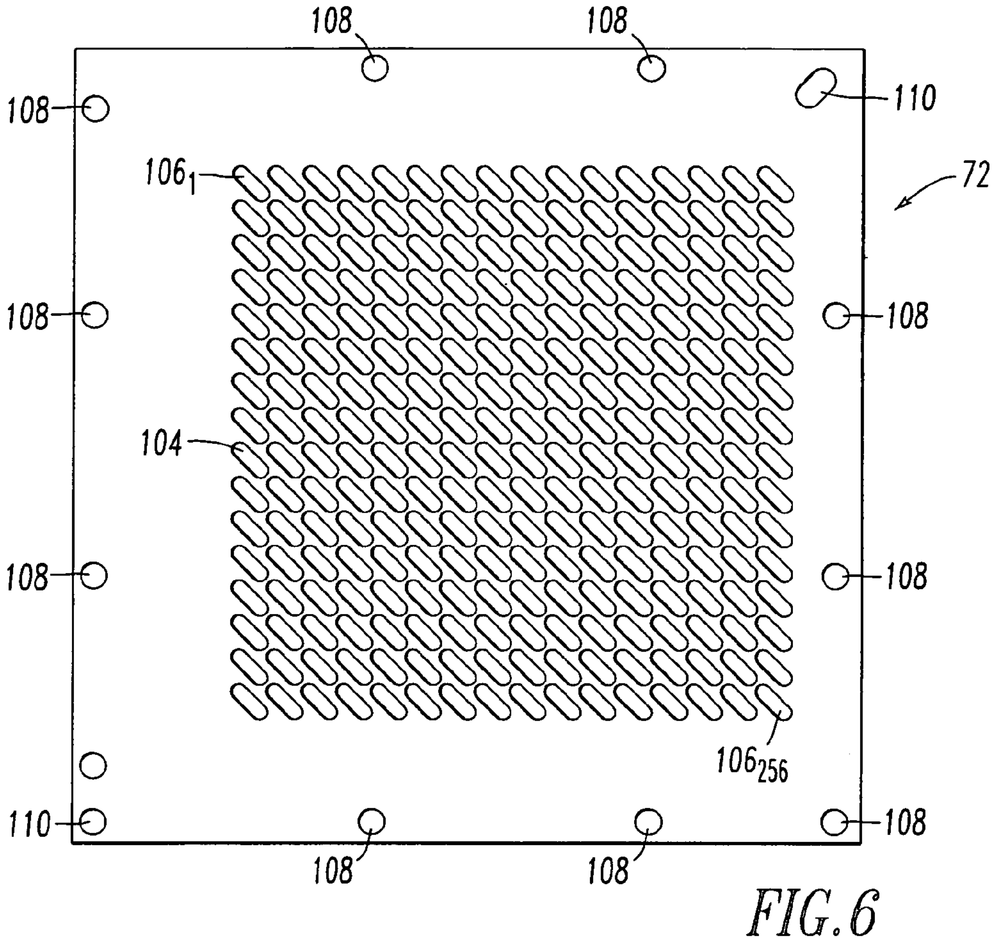
FIG. 6 is a plan view of a first spring gasket member which is located between the faceplate shown in FIG. 4 and a waveguide relocator panel.

Referring now to FIG. 6, located immediately below and in contact with the antenna faceplate 68 is the first Be—Cu spring gasket member 72 which is shown having a grid 104 of two hundred fifty six elongated oblong openings 106$_1$ . . . 106$_{256}$ which are mutually angulated and match the size and shape of the radiator elements 67$_1$ . . . 67$_{256}$ formed in the faceplate 68. The spring gasket 72 also includes a set of mounting holes 108 and alignment holes 110 formed adjacent the outer edges of the openings which mate with the mounting holes 100 and alignment holes 102 in the faceplate 68.

Immediately adjacent the first spring gasket member 72 is the waveguide relocator panel 69 shown in FIGS. 7A and 7B 69 comprised of sixteen waveguide relocator sub-panel sections 70$_1$ . . . 70$_{16}$, one of which is shown in FIG. 7C. FIG. 7A depicts the front face of the relocator panel 69 while FIG. 7B depicts the rear face thereof.

The relocator panel 69 is preferably comprised of multiple layers of diffusion bonded copper laminates with dielectric filling. However, when desired, multiple layers of low temperature co-fired ceramic (LTCC) material or high temperature co-fired ceramic (HTCC) or other suitable ceramic material could be used when desired, based upon the frequency range of the tile application.

As shown in FIG. 7C, each relocator sub-panel section 70 includes a rectangular grid of sixteen waveguide ports 112$_1$ . . . 112$_{16}$ slanted at 45° and located in an outer surface 114. The waveguide ports 112$_1$ . . . 112$_{16}$ are in alignment with a corresponding number of radiator elements 67 in the faceplate 68 and matching openings 106$_1$ . . . 106$_{256}$ in the spring gasket 72 (FIG. 6).

Figure 8A:
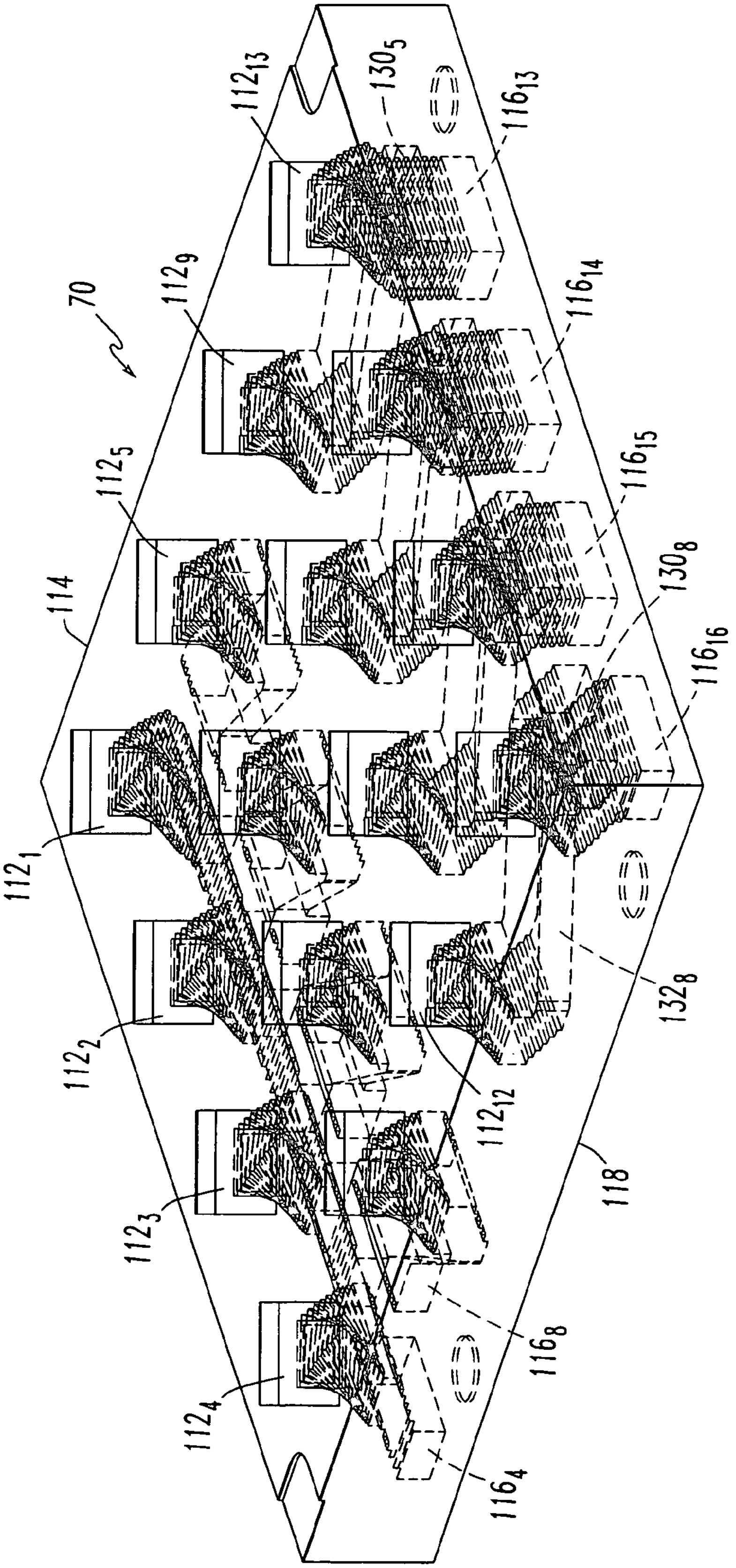
FIGS. 8A–8C are diagrams illustrative of the details of the waveguide relocator sub-panel shown in FIG. 7C.
Figure 8B:
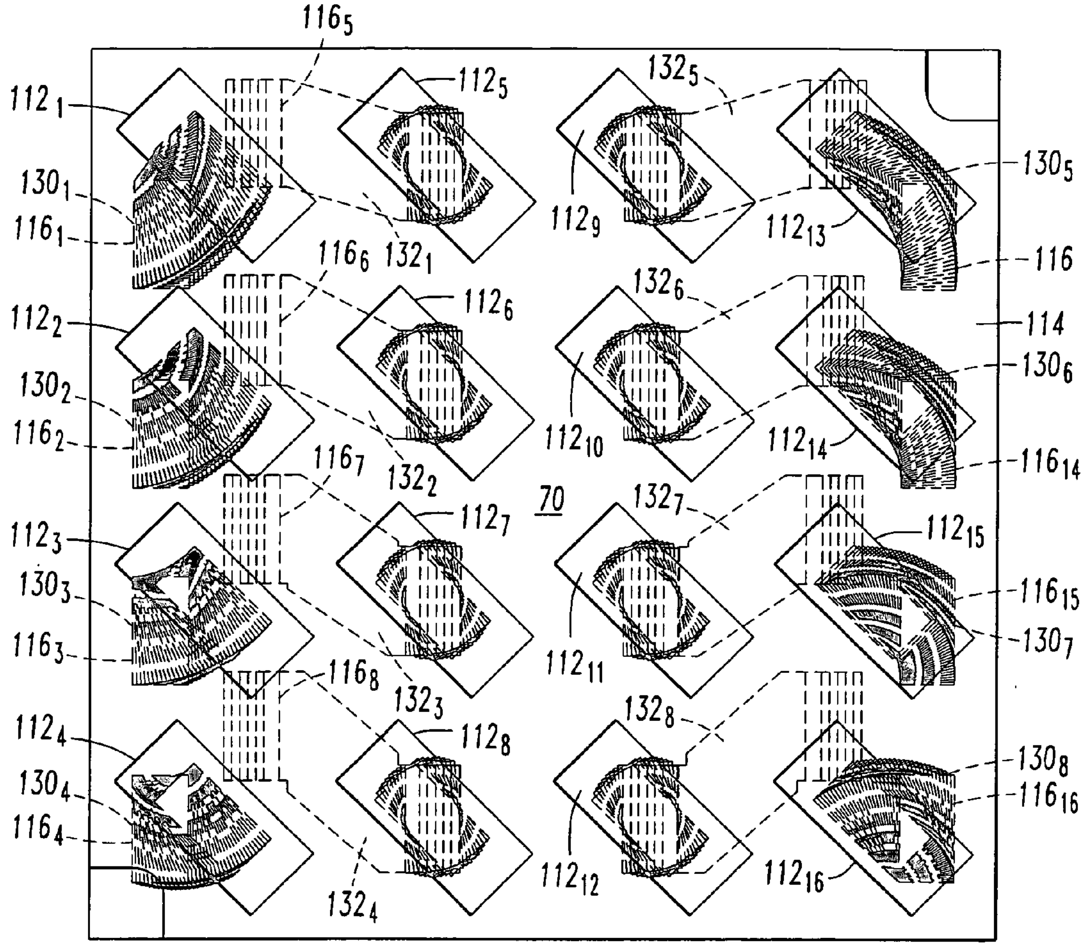
Figure 8C:
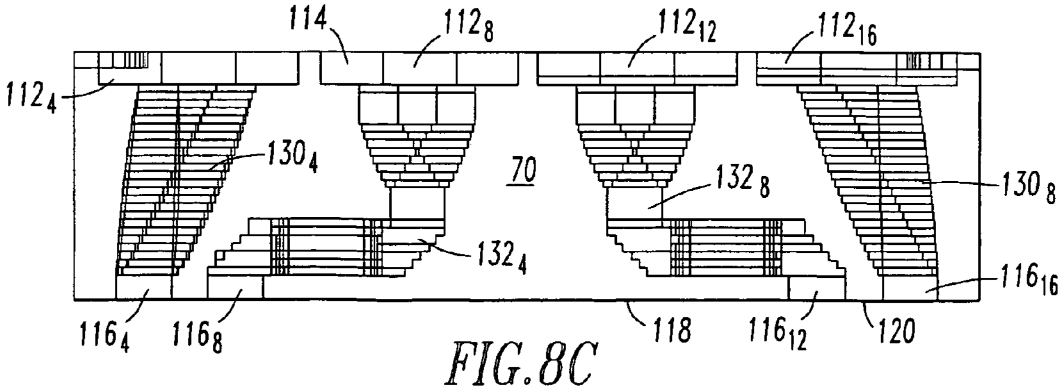
Figure 13:
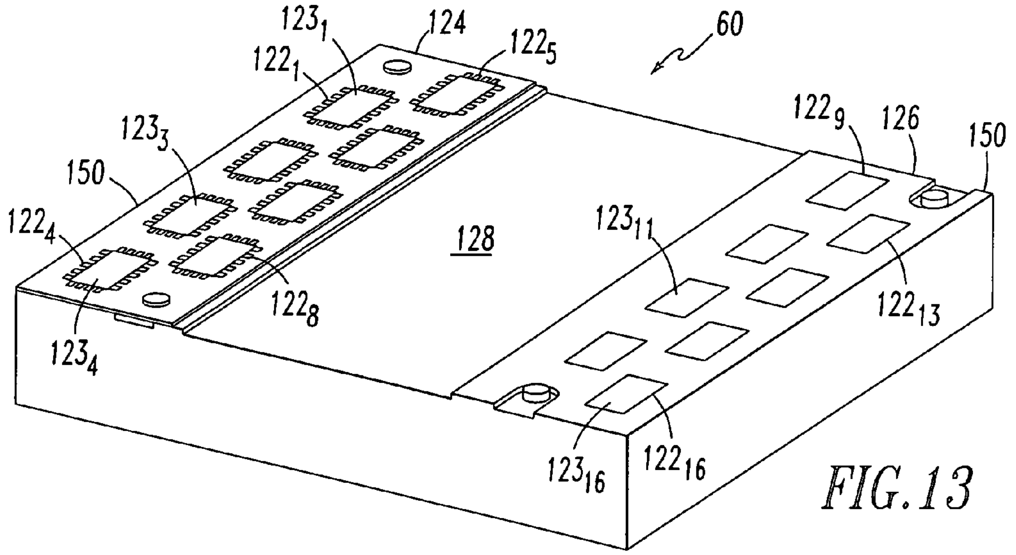
FIG. 13 is a perspective view of the beam control tile shown in FIG. 12.

The waveguide ports 112$_1$ . . . 112$_{16}$ transition to two linear mutually offset sets of eight waveguide ports 116$_1$ . . . 116$_8$ and 116$_9$ . . . 116$_{16}$, shown in FIGS. 8A–8C, located on an inner surface 118. The waveguide ports 116$_1$ . . . 116$_8$ and 116$_9$ . . . 116$_{16}$ couple to two like linear mutually offset sets of eight waveguide ports 122$_1$ . . . 122$_8$ and 122$_9$ . . . 122$_{16}$ on the outer edge surface portions 124 and 126 of the beam control tiles 60$_1$ . . . 60$_{16}$, one of which is shown in FIG. 13. Such an arrangement allows room for sixteen transmit/receive (T/R) cells, to be described hereinafter, to be located in the center recessed portion 128 of each of the beam control tiles 60$_1$ . . . 60$_{16}$. The relocator sub-panel sections 70$_1$ . . . 70$_{16}$ of the waveguide relocator panel 69 thus operate to realign the ports 122$_1$ . . . 122$_{16}$ of the beam control tiles 60$_1$ . . . 60$_{16}$ from the side thereof back on to the grid 104 of the spring gasket 72 (FIG. 6) and the radiator elements 67 in the faceplate 68.

As further shown in FIGS. 8A–8C, each relocator sub-panel section 70 includes two sets of eight waveguide transitions 130$_1$ . . . 130$_8$ and 132$_1$ . . . 132$_8$ formed therein by successive incremental angular rotation, e.g., 45°/25=1.8° of the various rectangular waveguide segments formed in the panel layers. The transitions 130 comprise vertical transitions, while the transitions 132 comprise both vertical and lateral transitions. As shown, the vertical and lateral transitions 130$_1$ . . . 130$_8$ and 132$_1$ . . . 132$_8$ terminate in the mutually parallel ports 112$_1$ . . . 112$_{16}$ matching the openings 106 in the spring gasket 72 shown in FIG. 6 as well as the radiator elements 67 in the faceplate 68.

Figure 9:
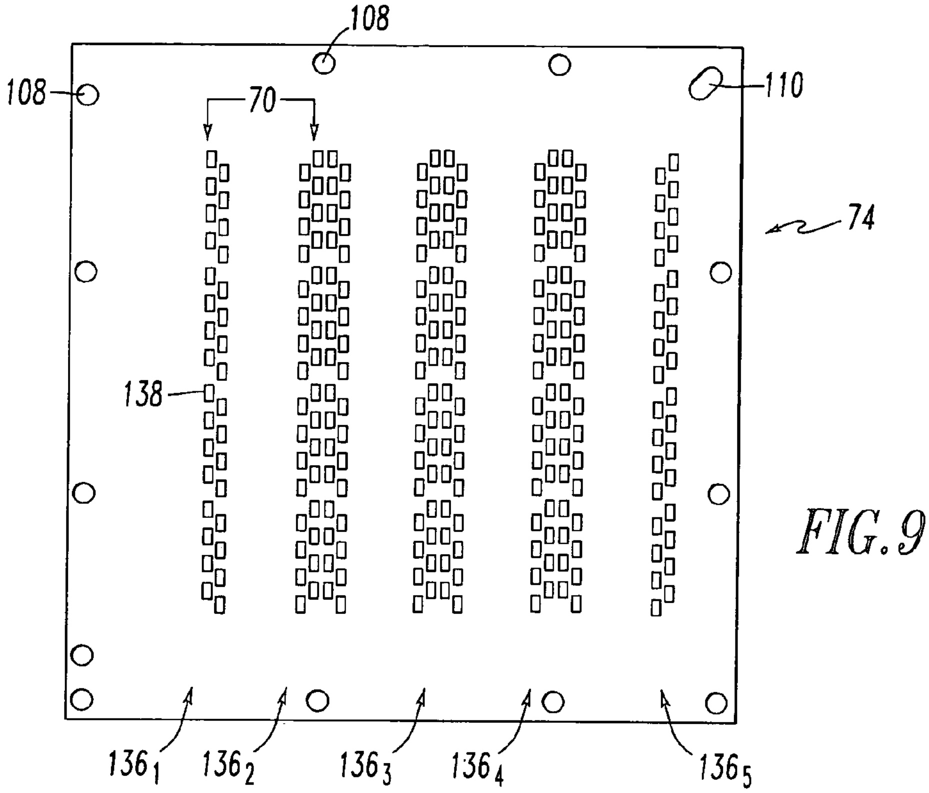
FIG. 9 is a plan view of a second spring gasket member located between the waveguide relocator panel shown in FIGS. 7A and 7B and an outer heat sink member which is shown in FIG. 2.
Figure 10:
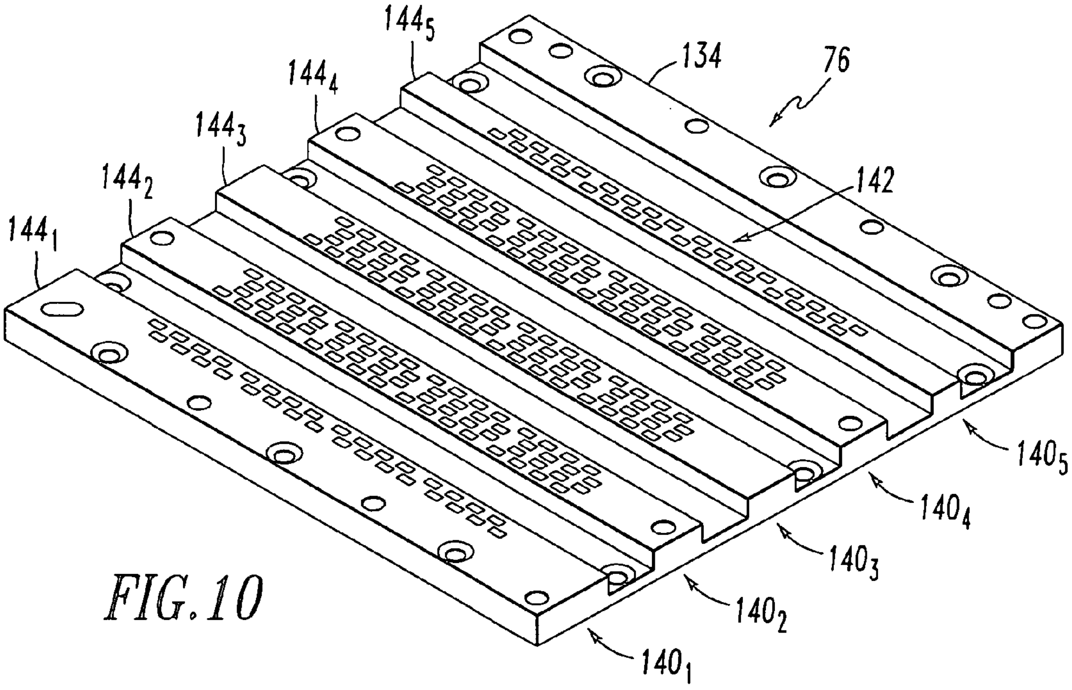
FIG. 10 is a perspective view of the outer heat sink shown in FIG. 2.

Referring now to FIG. 9, shown thereat is the second Be—Cu spring gasket member 74 which is located between the inner face of the waveguide relocator panels 69 shown in FIG. 7B and the outer surface of the outer heat sink member 76 shown in FIG. 10. The spring gasket 74 includes five sets 136$_1$ . . . 136$_5$ of rectangular openings 138 which are arranged to mate with the ports 116$_1$ . . . 116$_{16}$ of the relocator sub-panel sections 70$_1$ . . . 70$_{16}$. The five sets 136$_1$ . . . 136$_5$ of openings 138 are adapted to also match five like sets 140$_1$ . . . 140$_5$ of waveguide ports 142 in the outer surface 134 of the outer heat sink 76 and which form portions of five sets of RF dielectric filled waveguides, not shown, formed in the raised elongated parallel heat sink body portions 144$_1$ . . . 144$_5$.

Figure 11:
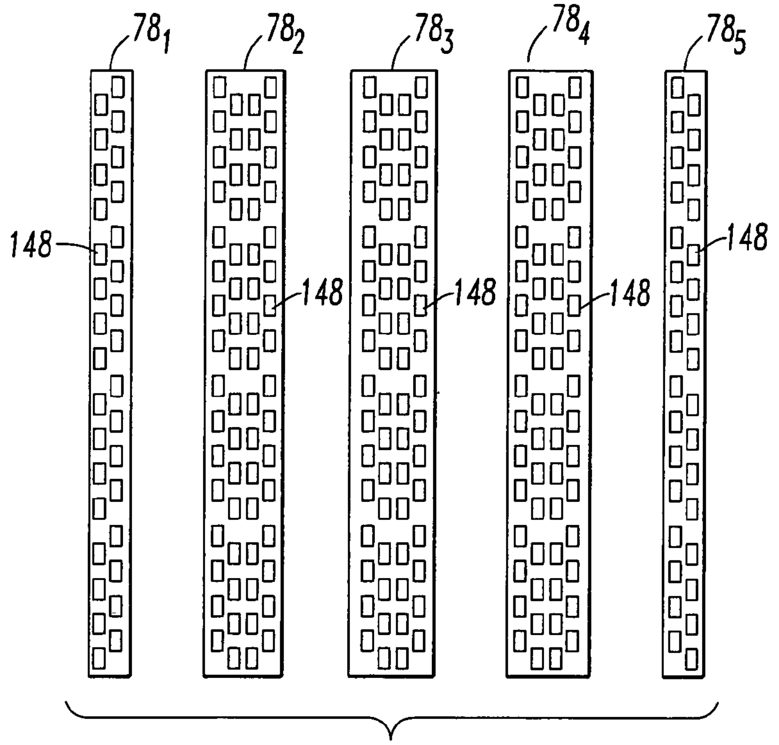
FIG. 11 is a plan view illustrative of a third set of five spring gasket members located between the underside of the outer heat sink shown in FIG. 10 and an array of sixteen co-planar beam control tiles shown located behind the heat sink in FIG. 2.
Figure 12:
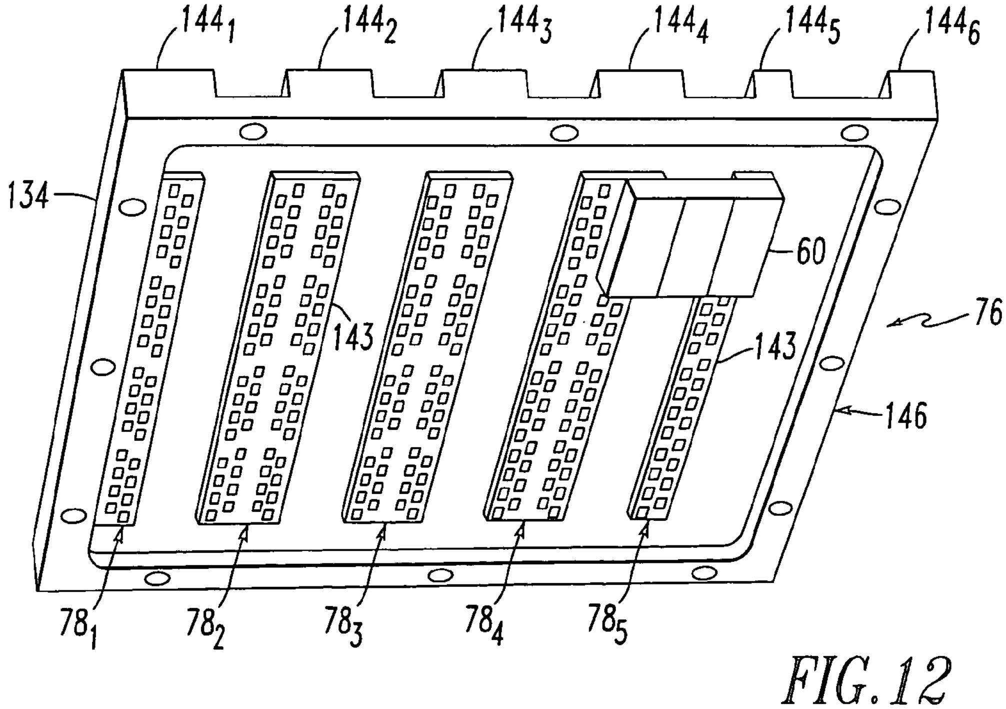
FIG. 12 is a perspective view of the underside of the outer heat sink shown in FIG. 10 with the third set of spring gaskets shown in FIG. 11 attached thereto as well as one of sixteen beam control tiles.

Referring now to FIG. 11, shown thereat is a third set of five discrete Be—Cu spring gasket members 78$_1$, 78$_2$ . . . 78$_5$ which are mounted on the back surface 146 of the outer heat sink 76 as shown in FIG. 12 and include rectangular opening 148 which match the arrangement of openings 138 in the second spring gasket 74 shown in FIG. 9 as well as the waveguide ports 143 in the heat sink 76 and the dielectric filled waveguides, not shown, which extend through the body portions 144$_1$ . . . 144$_5$ to the inner surface 146 as shown in FIG. 12. FIG. 12 also shows for sake of illustration one beam control tile 60 (FIG. 13) located on the inner surface 146 of the outer heat sink 76 against the spring gasket members 78$_4$ and 78$_5$. It is to be noted, however, that sixteen identical beam control tiles 60$_1$ . . . 60$_{16}$ as shown in FIG. 13 are actually assembled side by side in a rectangular array on the back surface of the heat sink 76.

Considering now the construction of the beam control tiles $60_1 \ldots 60_{16}$, one of which is shown in perspective view in FIG. 13 by reference numeral 60, it is preferably fabricated from multiple layers of LTCC material. When desired however, high temperature co-fired ceramic (HTCC) material could be used. As noted above, each beam control tile 60 of the tiles $60_1 \ldots 60_{16}$ includes sixteen waveguide ports $122_1 \ldots 122_{16}$ and associated dielectric waveguides $123_1 \ldots 123_{16}$ arranged in two offset sets of eight waveguide ports $122_1 \ldots 122_8$ and $122_9 \ldots 122_{16}$ mutually supported on the outer surface portions 124 and 126 of an outermost layer 150.

Figure 14A:
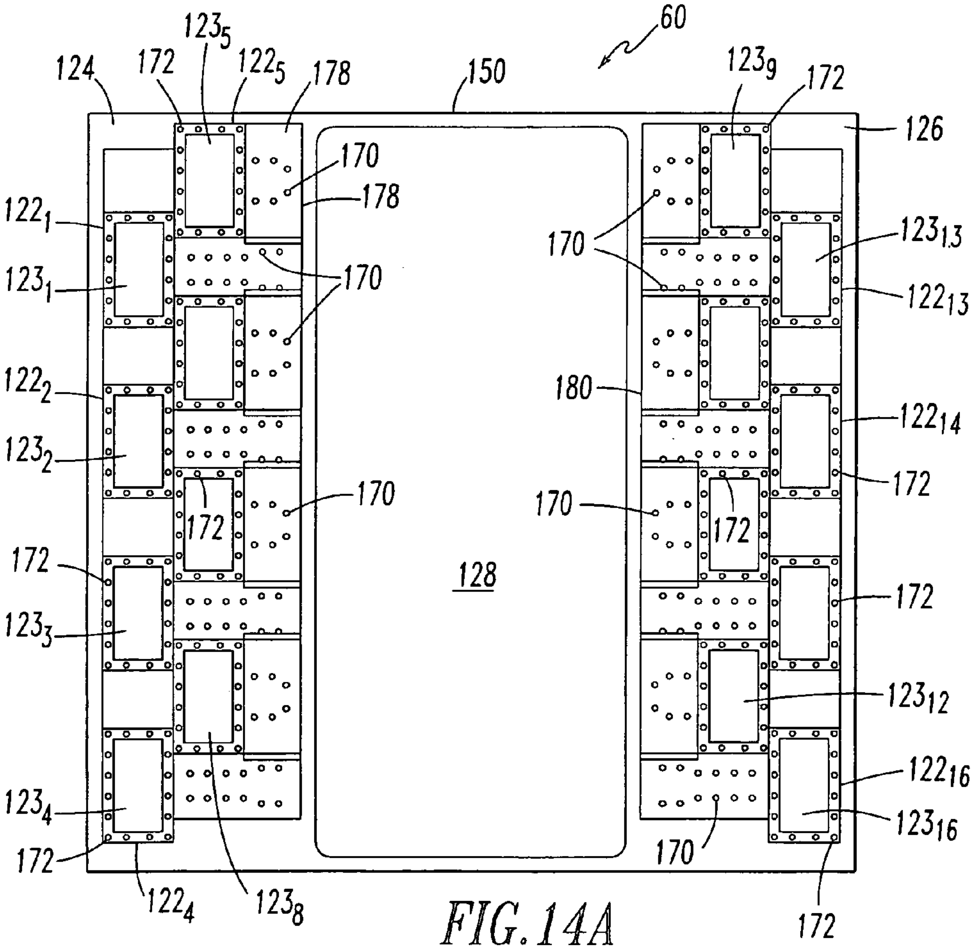
FIGS. 14A–14J are top plan views illustrative of the details of the ceramic layers implementing the RF, DC bias and control signal circuit paths of the beam control tile shown in FIG. 13.
Figure 14B:
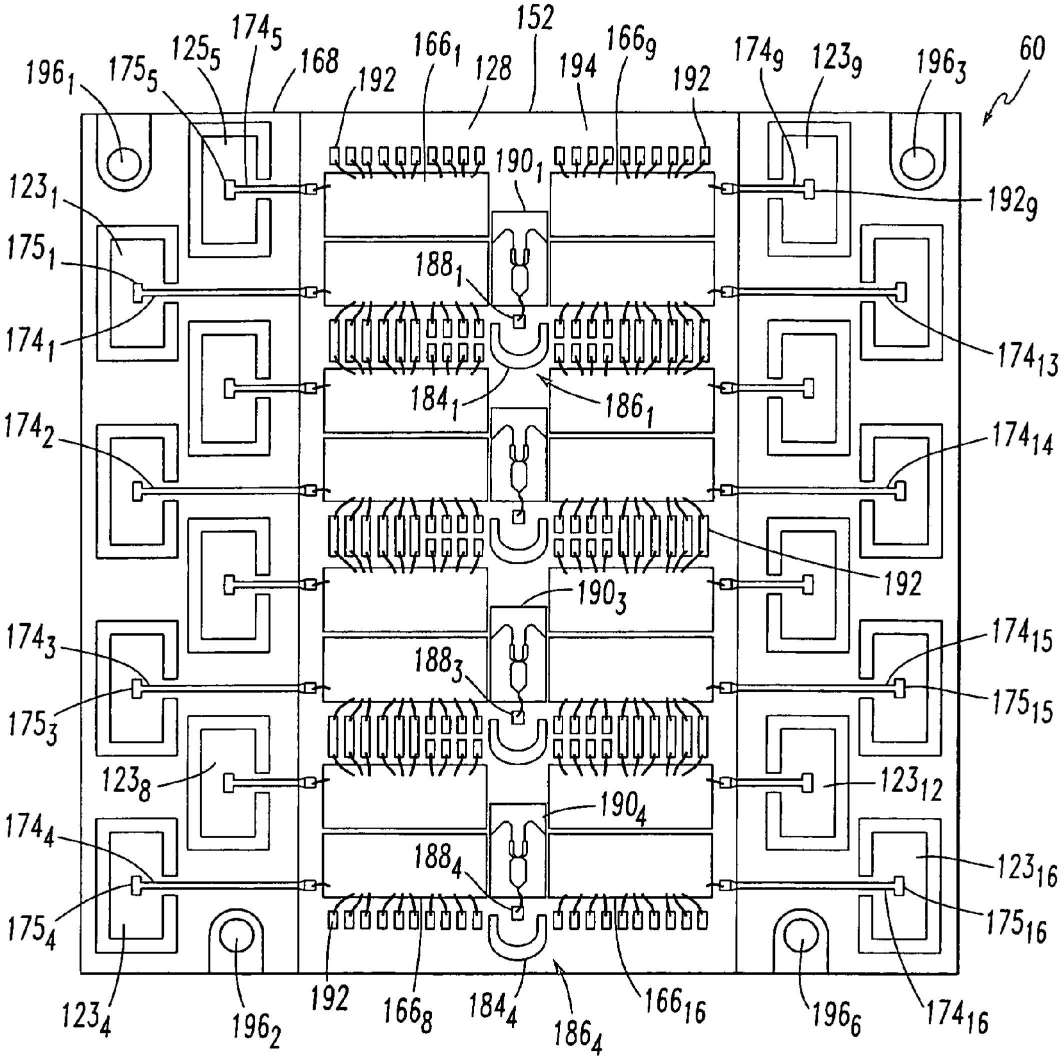

Referring now to FIG. 14A, shown thereat is a top plan view of the beam control tile 60 shown in FIG. 13. Under the centralized generally rectangular recessed cavity region 128 is located sixteen T/R chips $166_1 \ldots 166_{16}$, fabricated in gallium arsenide (GaAs), located on an underlying layer 152 of the beam control tile 60 as shown in FIG. 14B. The layer 150 shown in FIG. 14A including the outer surface portions also includes metallic vias 170 which pass through the various LTCC layers so as to form RF via walls on either side of two sets of buried stripline transmission lines $174_1 \ldots 174_8$ and $174_9 \ldots 174_{16}$ located on layer 152 (FIG. 14B). Vias are elements of conductor material which are well known in the art and comprise metallic pathways between one or more layers of dielectric material, such as, but not limited to, layers of LTCC or HTCC material. The walls of the vias 170 ensure that RF signals do not leak from one adjacent channel to another. Also, shown in an arrangement of vias 172 which form two sets of the eight RF waveguides $123_1 \ldots 123_8$, and $123_9 \ldots 123_{16}$ shown in FIG. 13. Two separated layers of metallization 178 and 180 are formed on the outer surface portions 124 and 126 overlaying the vias 170 and 172 and act as shield layers.

FIG. 14B shows the next underlying layer 152 of the beam control tile 60 where sixteen GaAs T/R chips $166_1 \ldots 166_{16}$ are located in the cavity region 128. The T/R chips $166_1 \ldots 166_{16}$ will be considered subsequently with respect to FIG. 15. The layer 152, as shown, additionally includes the metallization for the sixteen waveguides $123_1 \ldots 123_8$ and $123_9 \ldots 123_{16}$ overlaying the vias 172 shown in FIGS. 14A, 14C and 14E as well as the stripline transmission line elements $174_1 \ldots 174_8$ and, $174_9 \ldots 174_{16}$ which terminate in respective waveguide probe elements $175_1 \ldots 175_8$ and $175_9 \ldots 175_{16}$.

In FIG. 14B, four coaxial transmission line elements $186_1 \ldots 186_4$ including outer conductor $184_1 \ldots 184_4$ and center conductors $188_1 \ldots 188_4$ are shown in central portion of the cavity region 128. The center conductors $188_1 \ldots 188_4$ are connected to four RF signal dividers $190_1 \ldots 190_4$ which may be, for example, well known Wilkinson signal dividers which couple RF signals between the T/R chips $166_1 \ldots 166_{16}$ and the coaxial transmission lines $186_1 \ldots 186_4$. DC control signals are routed within the beam control tile 60 and surface in the cavity region 128 and are bonded to the T/R chips with gold bond wires 192 as shown. Also shown in FIG. 14B are four alignment pins $196_1 \ldots 196_4$ located at or near the corners of the tile 60.

Figure 14C:
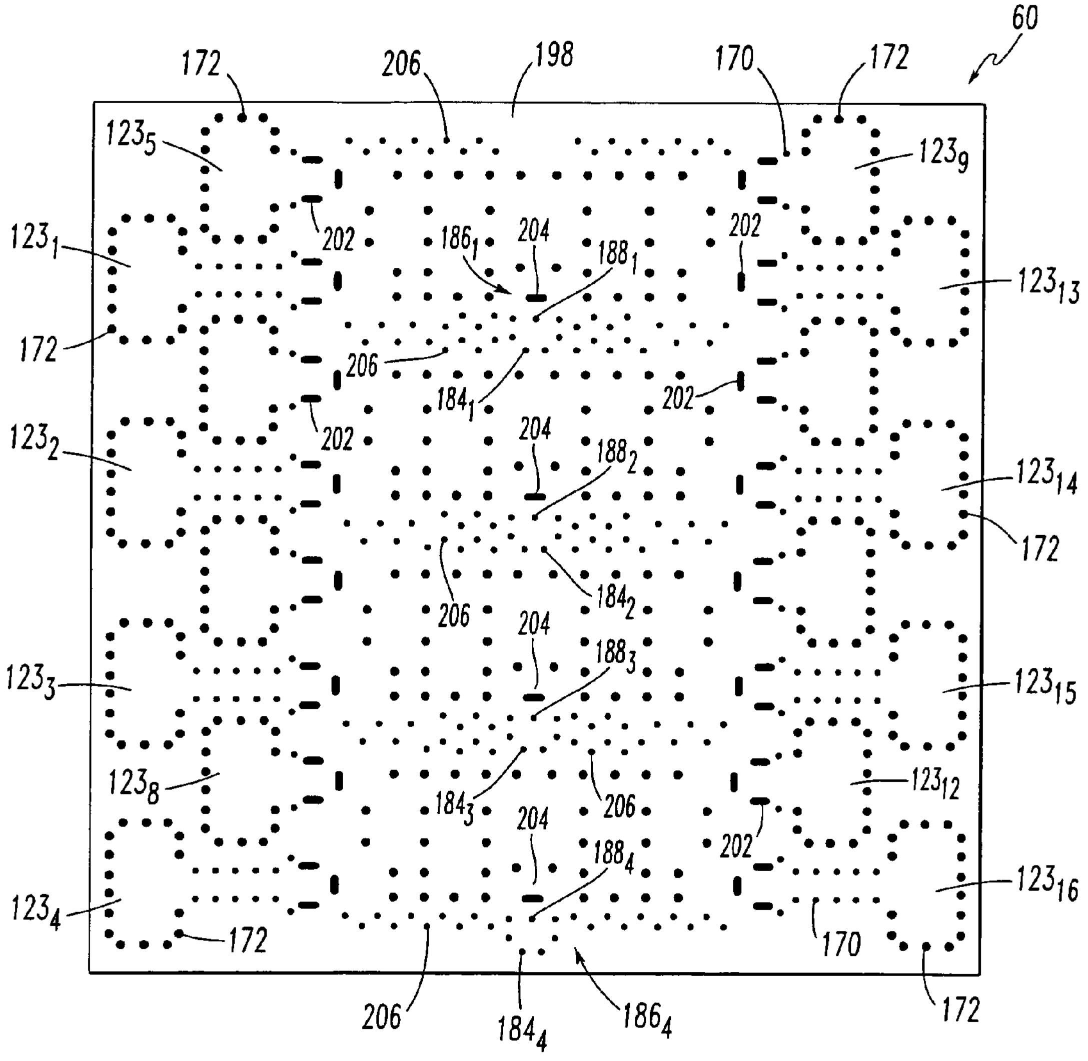

Referring now to FIG. 14C, shown thereat is a tile layer 198 below layer 152 (FIG. 14B). Layer 198 contains the configuration of vias 172 that are used to form walls of waveguides $123_1 \ldots 123_4$. In addition, a plurality of vias 202 are placed close together to form a slot in the dielectric layer so as to ensure that a good ground is presented for the T/R chips $166_1 \ldots 166_{16}$ shown in FIG. 14B at the point where RF signals are coupled between the T/R chips $166_1 \ldots 166_{16}$ and the waveguides $123_1 \ldots 123_4$ to the respective chips. Another set of via slots 204 are included in the outer conductor portions $184_1 \ldots 184_4$ of the coaxial transmission line elements $186_1 \ldots 186_4$ to produce a capacitive matching element so as to provide a match to the bond wires connecting the RF signal dividers $190_1 \ldots 190_4$ to the inner conductor elements $188_1 \ldots 188_4$ as shown in FIG. 14B. Also, there is provided a set of vias 206 for providing grounded separation elements between the overlying T/R chips $166_1 \ldots 166_{16}$.

Figure 14D:
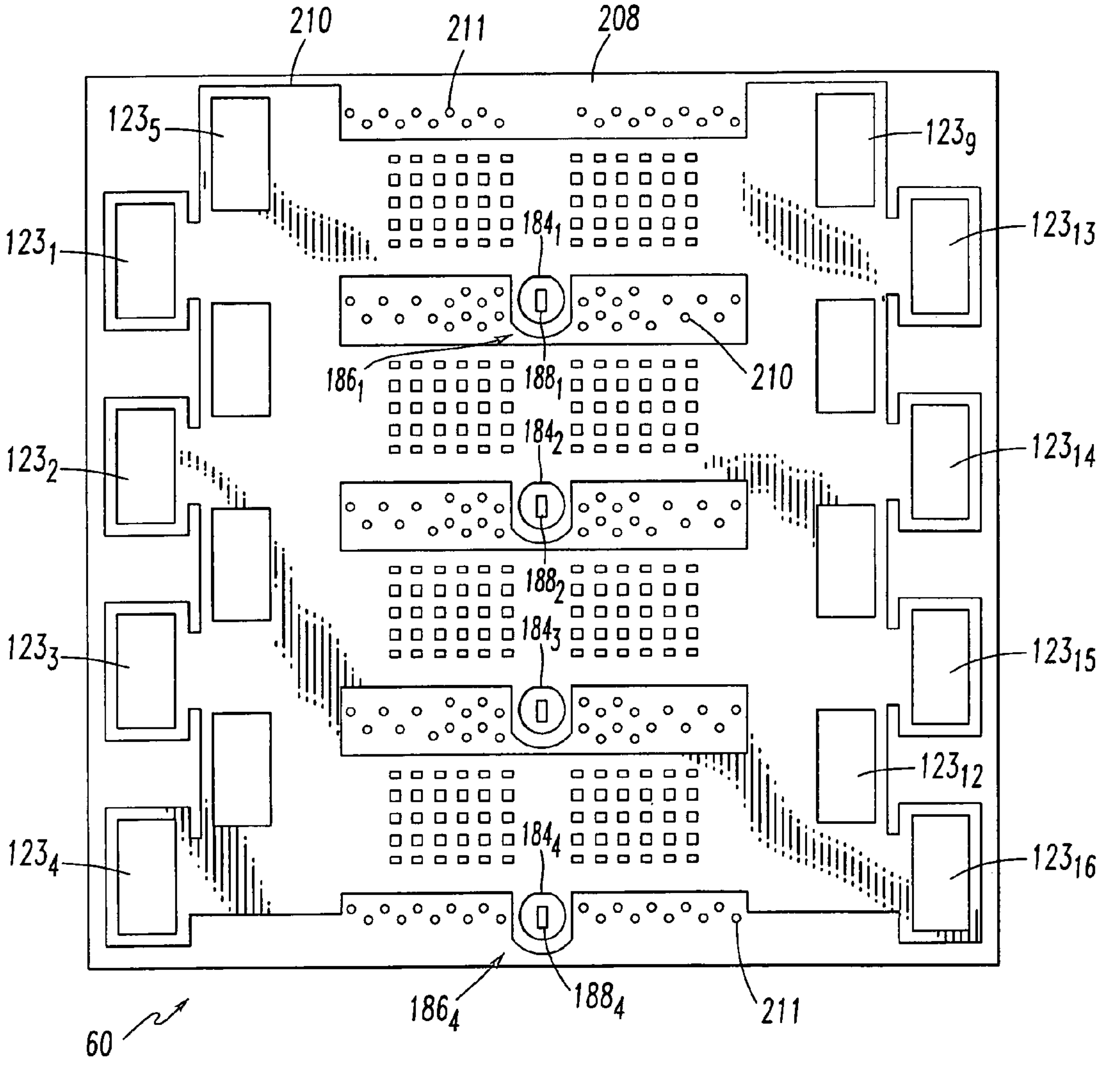

Turning attention now to FIG. 14D, shown thereat is a buried ground layer 208 which includes a metallized ground plane layer 210 of metallization for walls of the waveguides $123_1 \ldots 123_4$, the underside of the active T/R chips $166_1 \ldots 166_{16}$ as well as the coaxial transmission line elements $186_1 \ldots 186_4$, Also provided on the layer 208 is an arrangement of DC connector points 211 for the various components in the T/R chips $166_1 \ldots 166_{16}$. Portions of the center conductors $188_1 \ldots 188_4$ and the outer conductors $184_1 \ldots 184_4$ for the coaxial transmission line elements $186_1 \ldots 186_4$ are also formed on layer 208.

Figure 14E:
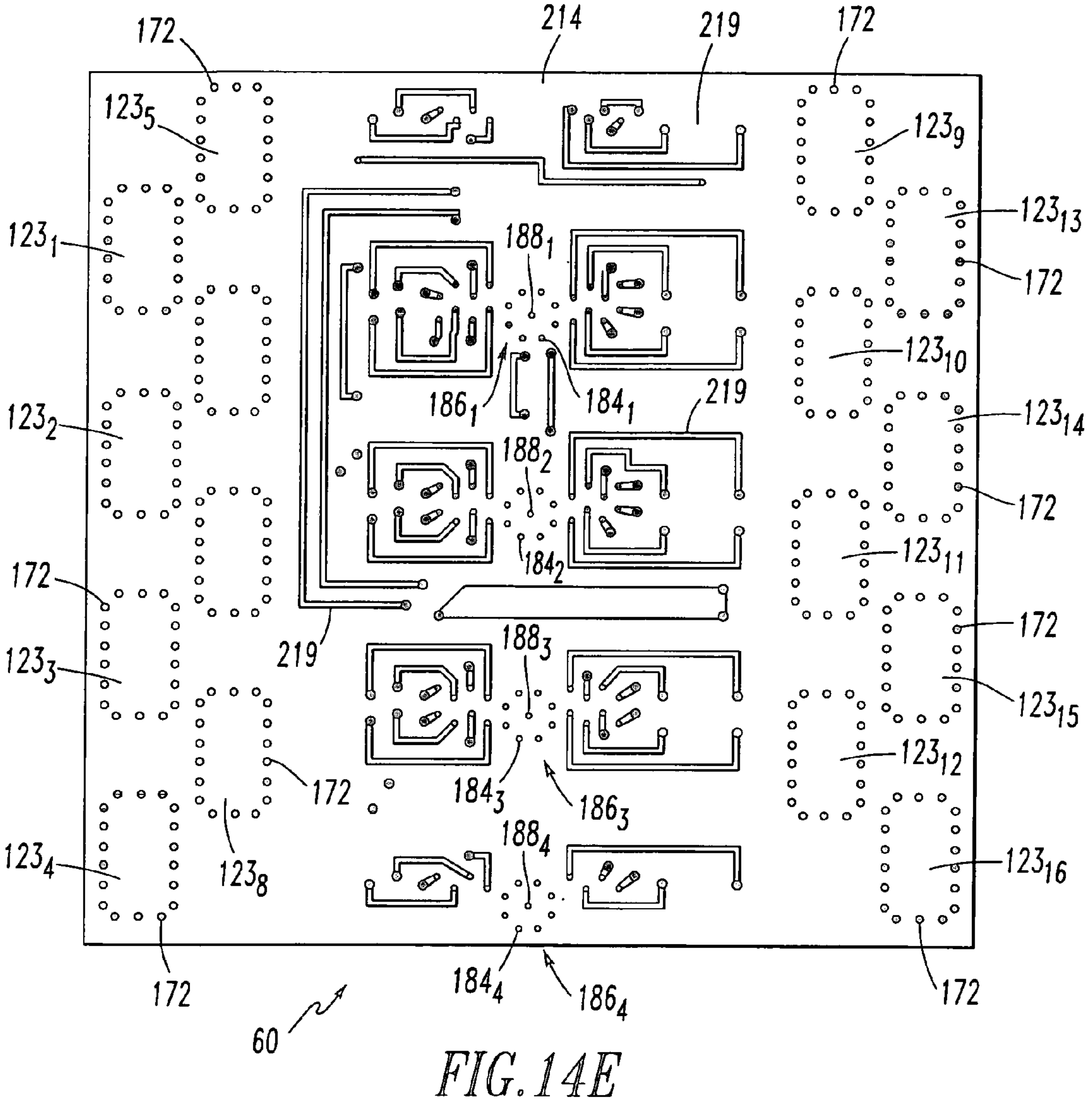

Beneath the ground plane layer 208 is a signal routing layer 214 shown in FIG. 14E which also includes the vertical vias 172 for the sixteen waveguides $123_1 \ldots 123_4$. Also shown are vias of the inner and outer conductors $188_1 \ldots 188_4$ and $184_1 \ldots 184_4$ of the four coaxial transmission lines $186_1 \ldots 186_4$, Also located on layer 214 is a pattern 219 of stripline members for routing DC control and bias signals to their proper locations.

Figure 14F:
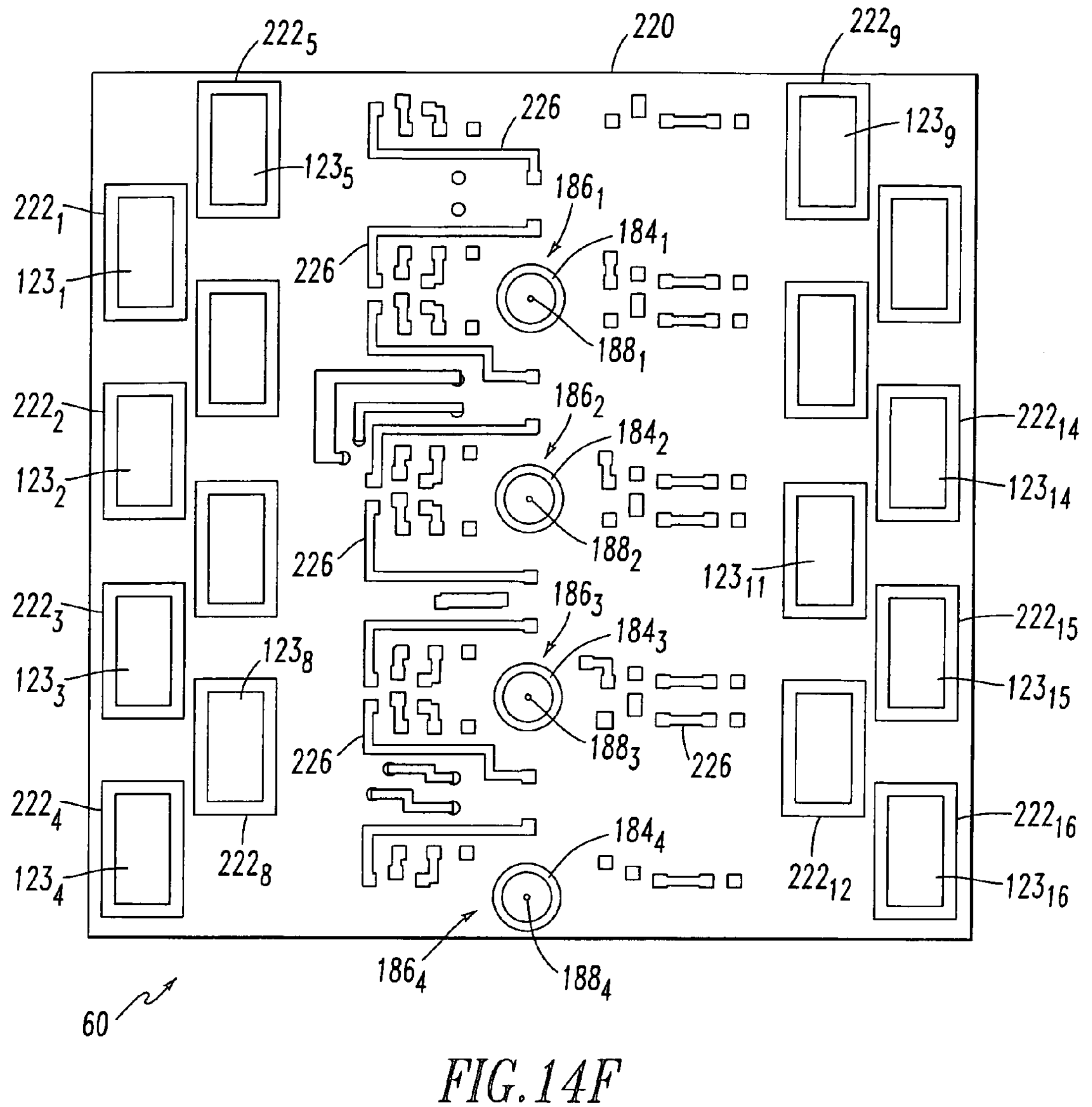

Below layer 214 is dielectric layer 220 shown in FIG. 14F which is comprised of sixteen rectangular formations $222_1 \ldots 222_{16}$ of metallization further defining the side walls of the waveguides $176_1 \ldots 176_{16}$ along with the vias 172 shown in FIGS. 14A, 14C and 14E. Four rings of metallization are shown which further define the outer conductors $184_1 \ldots 184_4$ of the coaxial lines $186_1 \ldots 186_4$ along with vias forming the center conductors $188_1 \ldots 188_4$. Also shown are patterns 226 of metallization used for routing DC signals to their proper locations.

Figure 14G:
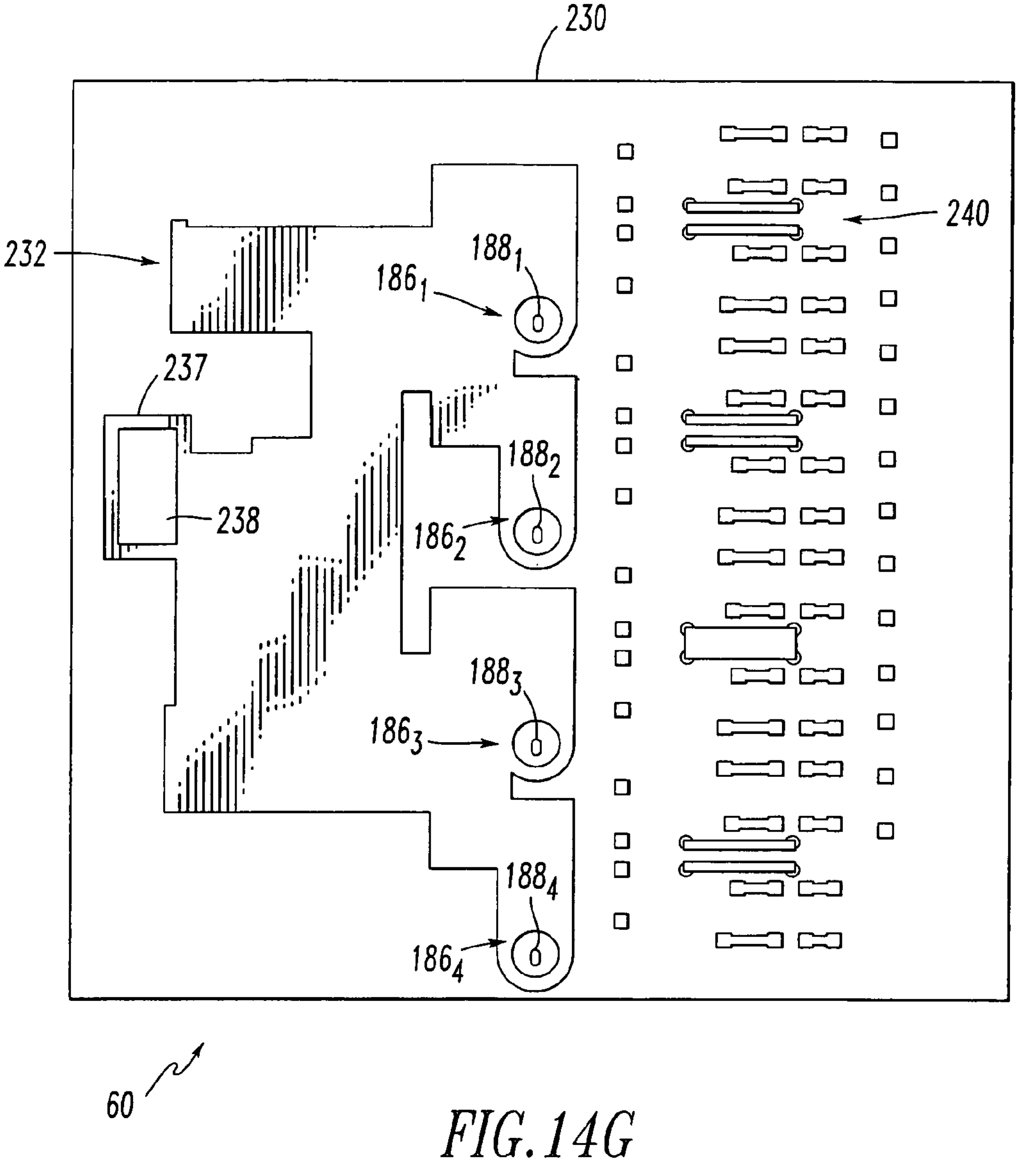
Figure 14H:
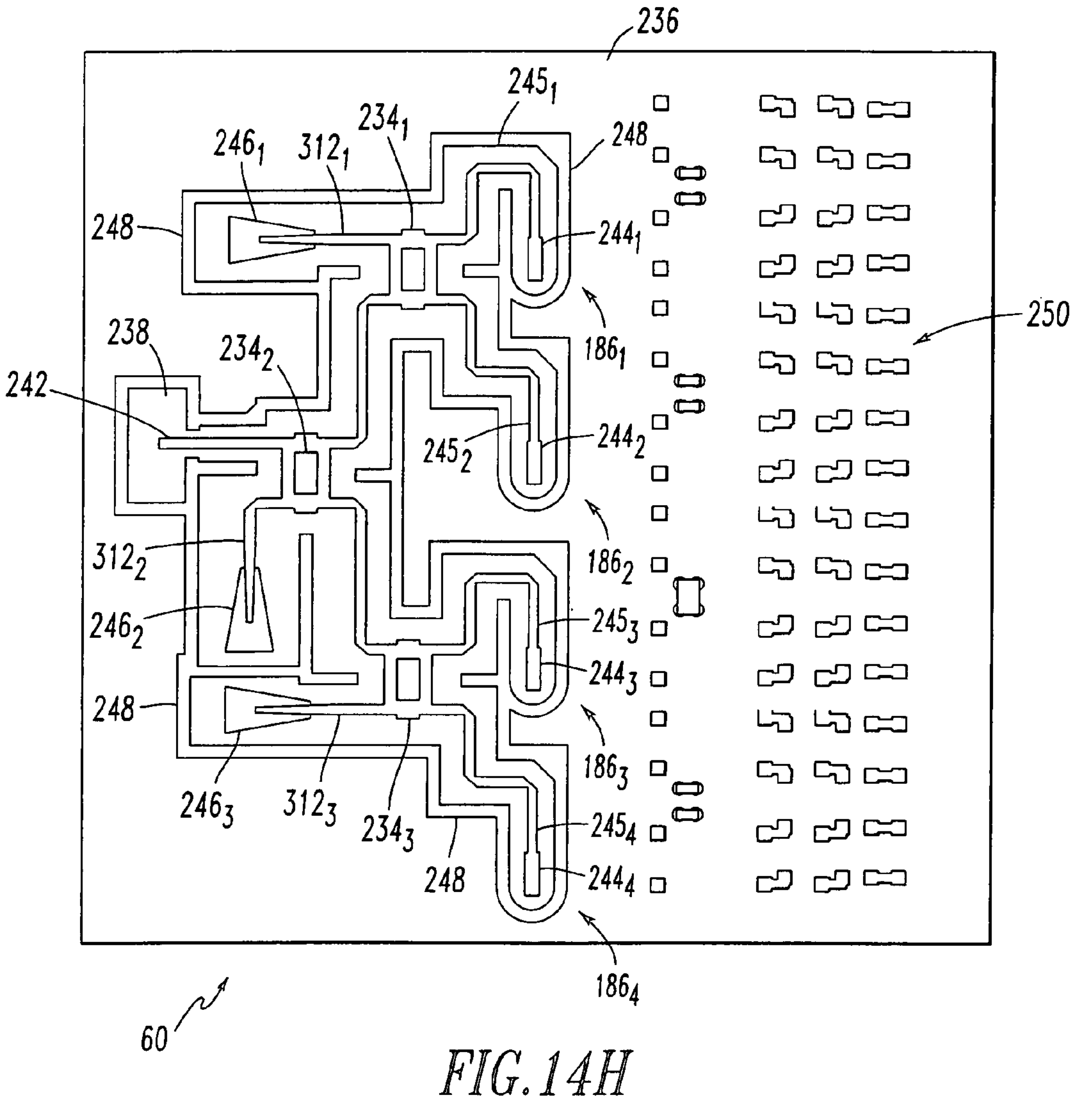

Referring now to FIG. 14G, shown thereat is a dielectric layer 230 which includes a top side ground plane layer 232 of metallization for three RF branch line couplers shown in the adjacent lower dielectric layer 236 shown in FIG. 14H by reference numerals $234_1$, $234_2$, $234_3$. The layer of metallization 232 also includes a rectangular portion of metallization 237 for defining the waveguide walls of a single waveguide 238 on the back side of the beam control tile 60 for routing RF between one of the four transceiver modules $32_1 \ldots 32_4$ (FIG. 2) and the sixteen waveguides $123_1 \ldots 123_4$, shown, for example, in FIGS. 14A–14F. FIG. 14G also includes a pattern 240 of metallization for providing tracks for DC control of bias signals in the tile 60. Also, shown in FIG. 14G are metallizations for the vias of the four center conductors $188_1 \ldots 188_4$ of the four coaxial transmission line elements $186_1 \ldots 186_4$.

With respect to FIG. 14H, shown thereat are the three branch couplers $234_1$, $234_2$ and $234_3$, referred to above. These couplers operate to connect an RF via waveguide probe 242 within the backside waveguide 238 to four RF feed elements $244_1 \ldots 244_4$ which vertically route RF to the four RF coaxial transmission lines $186_1 \ldots 186_4$ in the tile structure shown in FIGS. 14D–14G. The three branch line couplers $234_1$, $234_2$, $234_3$ are also connected to respective dagger type resistive load members $246_1$, $246_2$ and $246_3$ shown in further detail in FIG. 18. All of these elements are bordered by a fence of metallization 248. As in the metallization of FIG. 14G, the right hand side of the layer 14H also includes a set of metal metallization tracks 250 for DC control and bias signals.

Figure 14I:
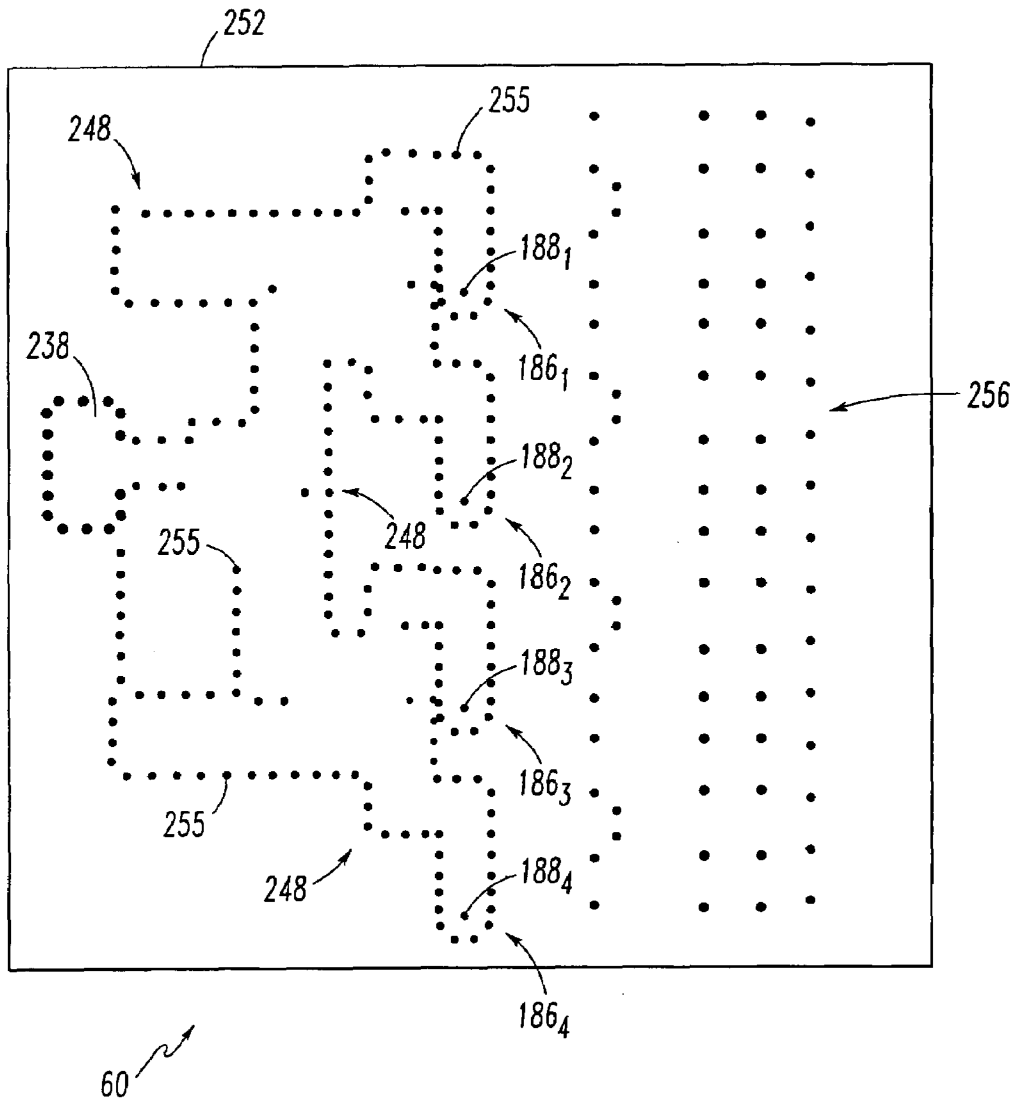

FIG. 14I shows an underlying via layer 252 including a pattern 254 of buried vias 255 which are used to further implement the fence 248 shown in FIG. 14I along with vias for the center conductors $\mathbf{188}_1$ . . . $\mathbf{188}_4$ of the coaxial lines $\mathbf{186}_1$ . . . $\mathbf{186}_4$. The dielectric layer 252 also includes three parallel columns of vias 256 which interconnect with the metallization patterns 240 and 250 shown in FIGS. 14G and 14H.

Figure 14J:
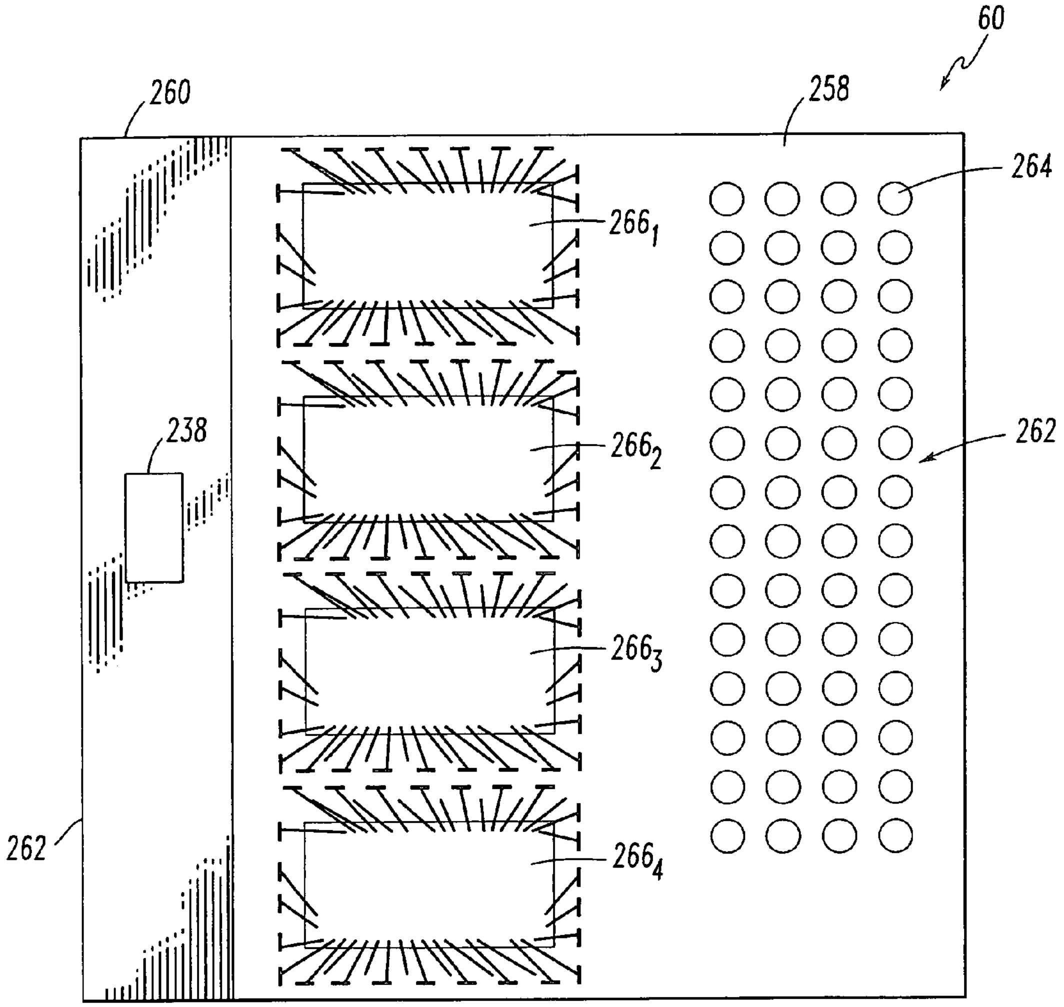

The back side or lowermost dielectric layer of the beam control tile 60 is shown in FIG. 14J by reference numeral 258 and includes a ground plane 260 of metallization having a rectangular opening defining a port 262 for the backside waveguide 238. A grid array 262 of circular metal pads 264 are located to one side of layer 258 and are adapted to mate with a "fuzz button" connector element on a board 80 shown in FIG. 2 so as to provide a solderless interconnection means for electrical components in the tile 60. Also located on the bottom layer 258 are four control chips $\mathbf{266}_1$ . . . $\mathbf{266}_4$ which are used to control the T/R chips $\mathbf{166}_1$ . . . $\mathbf{166}_{16}$ shown in FIG. 14B.

Figure 15:
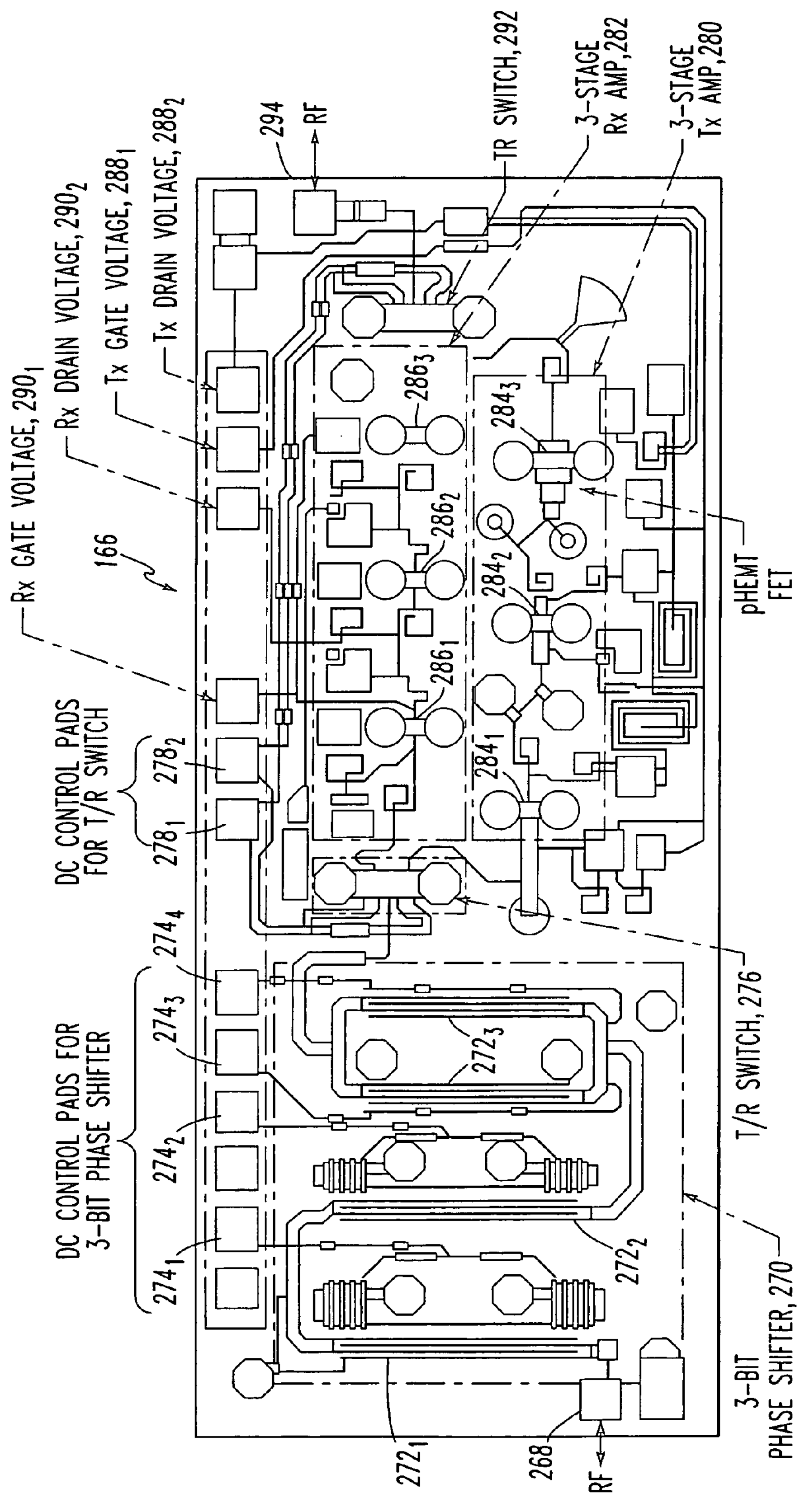
FIG. 15 is a plan view of the circuit elements included in a transmit/receive (T/R) cell located on a layer of the beam control tile shown in FIG. 14C.

Having considered the various dielectric layers in the beam control tile 60, reference is now made to FIG. 15 where there is shown a layout of one transmit/receive (T/R) chip 166 of the sixteen T/R chips $\mathbf{166}_1$ . . . $\mathbf{166}_{16}$ which are fabricated in gallium arsenide (GaAs) semiconductor material and are located on dielectric layer 182 shown in FIG. 14C. As shown, reference numeral 268 denotes a contact pad of metallization on the left side of the chip which connects to a respective signal divider 190 of the four signal dividers $\mathbf{190}_1$ . . . $\mathbf{190}_4$ shown in FIG. 14C. The contact pad 268 is connected to a three-bit RF signal phase shifter 270 implemented with microstrip circuitry including three phase shift segments $\mathbf{272}_1$, $\mathbf{272}_2$ and $\mathbf{272}_3$. Control of the phase shifter 270 is provided DC control signals coupled to four DC control pads $\mathbf{274}_1$ . . . $\mathbf{274}_4$. The phase shifter 270 is connected to a first T/R switch 276 implemented in microstrip and is coupled to two DC control pads $\mathbf{278}_1$ and $\mathbf{278}_2$ for receiving DC control signals thereat for switching between transmit (Tx) and receive (Rx) modes. The T/R switch 276 is connected to a three stage transmit (Tx) amplifier 280 and a three stage receive (Rx) amplifier 282, respectively implemented with the microstrip circuit elements and P type HEMT field effect transistors $\mathbf{284}_1$ . . . $\mathbf{284}_3$ and $\mathbf{286}_1$ . . . $\mathbf{286}_3$. A pair of control voltage pads $\mathbf{288}_1$ and $\mathbf{288}_2$ are utilized to supply gate and drain power supply voltages to the transmit (Tx) amplifier 280, while a pair of contact pads $\mathbf{290}_1$ and $\mathbf{290}_2$ supply gate and drain voltages to semiconductor devices in the RF receive (Rx) amplifier 282. A second T/R switch 292 is connected to both the Tx and Rx RF amplifiers 280 and 282, which in turn is connected via contact pad 294 to one of the sixteen transmission lines $\mathbf{174}_1$ . . . $\mathbf{174}_{16}$ shown in FIG. 14C which route RF signals to and from the waveguides $\mathbf{176}_1$ . . . $\mathbf{176}_{16}$.

FIGS. 16, 17A and 17B are illustrative of the microstrip and stripline transmission line components forming the transition from a T/R chip 166 in a beam control tile 60 to the waveguide probe 175 at the tip of transmission line element 174 in one of the waveguides 123 of the sixteen waveguides $\mathbf{123}_1$ . . . $\mathbf{123}_4$ (FIG. 14B). Reference numeral 125 denotes a back short for the waveguide member 123 As shown, the transition includes a length of microstrip transmission line 296 formed on the T/R chip 166 which connects to a microstrip track section 298 via a gold bond wire 300 in an air portion 302 of the beam control tile 60 where it then passes between a pair of adjoining layers 304 and 306 of LTCC ceramic material including an impedance matching segment 173 where it connects to the waveguide probe 175 shown in FIG. 17A. As shown in FIGS. 16 and 17A, the waveguide 123 is coupled upwardly to the antenna faceplate 68 through the relocator panel 69.

Figure 18:
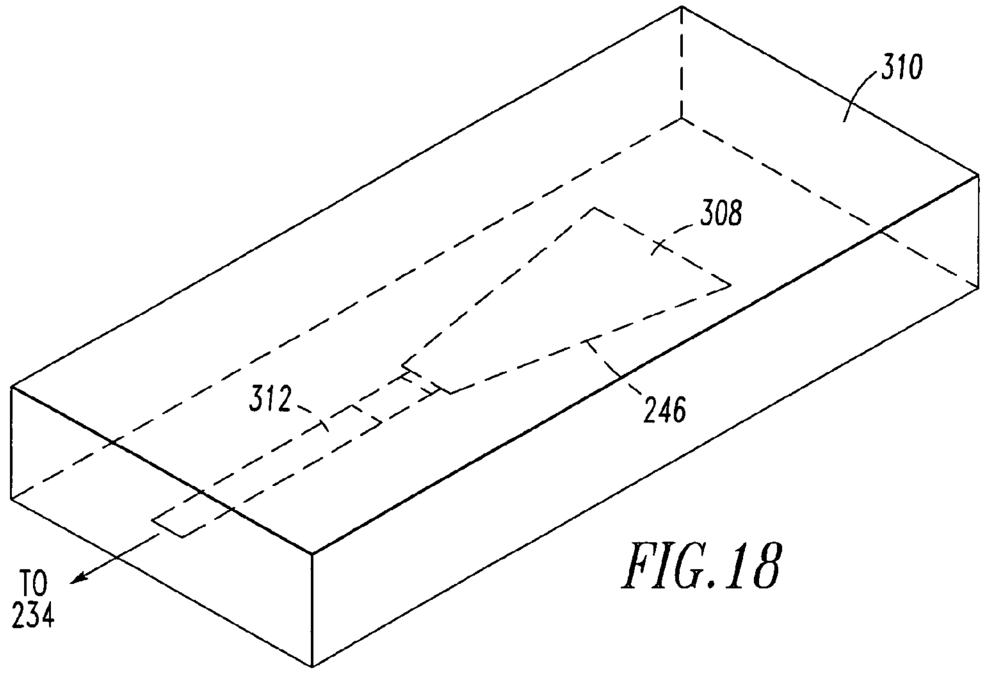
FIG. 18 is a perspective view of a dagger load for a stripline termination element included in the layer of the beam control tile shown in FIG. 13.

Considering briefly FIG. 18, it discloses the details of one of the dagger load elements 246 of the three dagger loads $\mathbf{246}_1$, $\mathbf{246}_2$ and $\mathbf{246}_3$ shown in FIG. 14H connected to one leg of the branch line couplers $\mathbf{234}_1$, $\mathbf{234}_2$, and $\mathbf{234}_3$. The dagger load element 246 consists of a tapered segment 308 of resistive material embedded in multilayer LTCC material 310. The narrow end of the resistor element 308 connects to a respective branch line coupler 234 of the three branch line couplers $\mathbf{234}_1$, $\mathbf{234}_2$, and $\mathbf{234}_3$ shown in FIG. 14H via a length of stripline material 312.

Figure 19A:
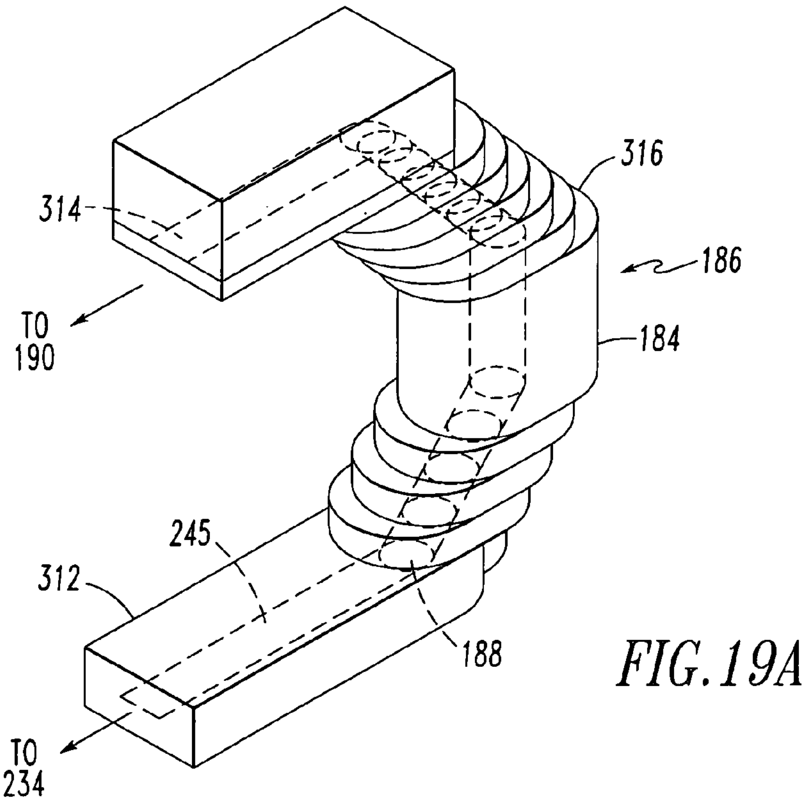
FIGS. 19A and 19B are perspective side views illustrative of the details of RF routing through various layers of a beam control tile.
Figure 19B:
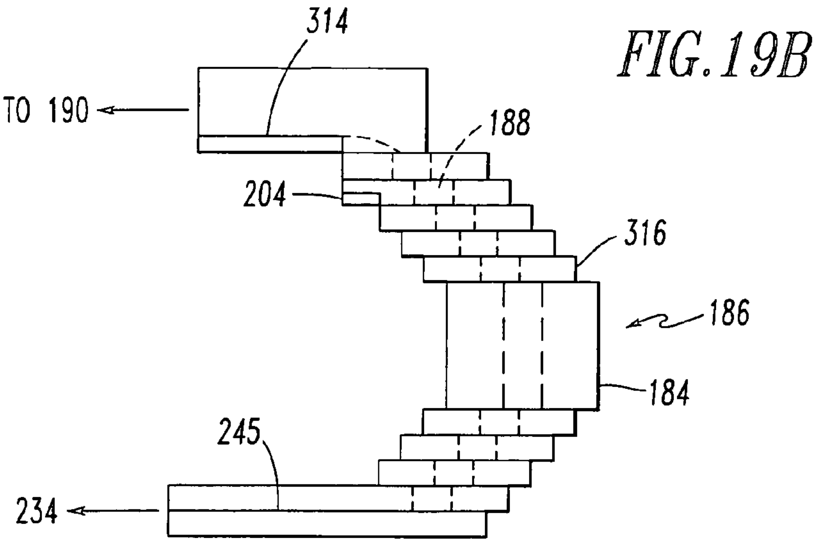

Referring now to FIGS. 19A and 19B, shown thereat are the details of the manner in which the coaxial RF transmission lines $\mathbf{186}_1$ . . . $\mathbf{186}_4$, shown for example in FIGS. 14B–14G, are implemented through the various dielectric layers so as to couple arms $\mathbf{245}_1$ . . . $\mathbf{245}_4$ of the branch line couplers $\mathbf{234}_1$ . . . $\mathbf{234}_3$ of FIG. 14H to the signal dividers $\mathbf{190}_1$ . . . $\mathbf{190}_4$ shown in FIG. 14B. As shown, a stripline connection 314 is made to a signal divider 190 via multiple layers 316 of LTCC material in which are formed arcuate center conductors 188 and the outer conductors 184 of a coaxial waveguide member 186 and terminating in the stripline 245 of a branch line coupler 234 so that the upper and lower extremities are offset from each other. Reference numeral 204 denotes the capacitive matching element shown in FIG. 14C.

Figure 20:
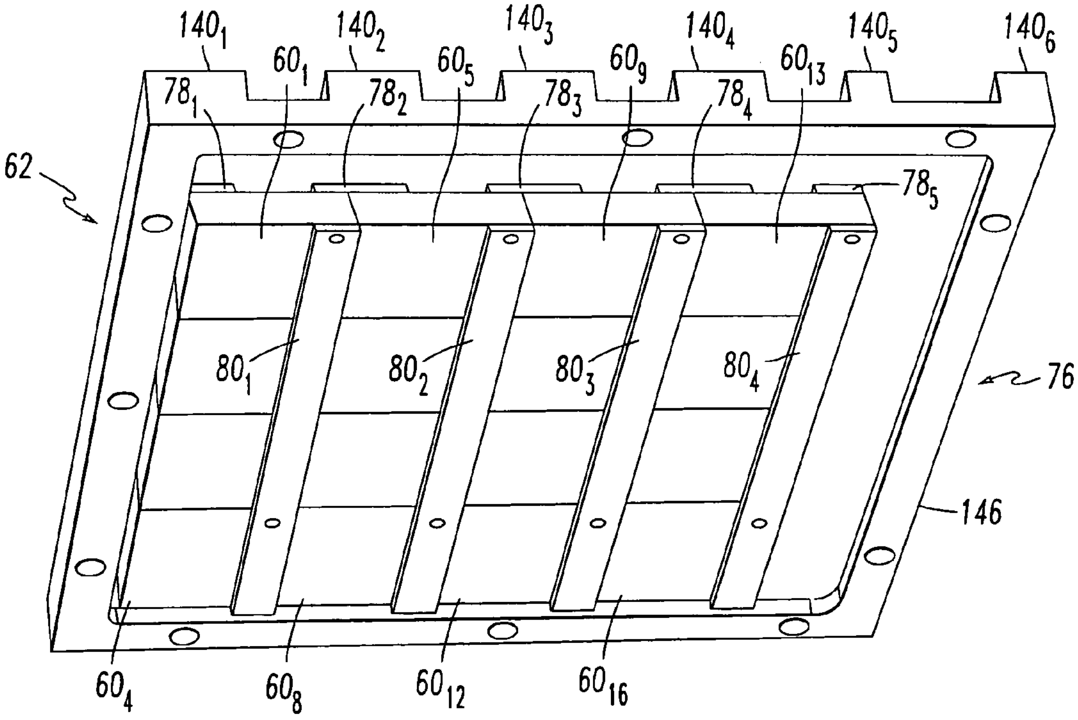
FIG. 20 is a perspective view of an array of sixteen beam control tiles mounted on the underside of the outer heat sink shown in FIG. 12 together with a set of DC connector fuzz button boards secured thereto.

Considering now the remainder of the planar components of the embodiment of the invention shown in FIG. 2, FIG. 20, for example, discloses the underside surface 146 of the outer heat sink member 76, previously shown in FIG. 12. However, FIG. 20 now depicts sixteen beam control tiles $\mathbf{60}_1$, $\mathbf{60}_2$, . . . $\mathbf{60}_{16}$ mounted thereon, being further illustrative of the array 62 of control tiles shown in FIG. 2. Beneath the beam control tiles $\mathbf{60}_1$ . . . $\mathbf{60}_{16}$ are the five spring gasket members $\mathbf{78}_1$ . . . $\mathbf{78}_5$ shown in FIG. 11. FIG. 20 now additionally shows a set of four fuzz button connector boards $\mathbf{80}_1$, $\mathbf{80}_2$, . . . $\mathbf{80}_4$ in place against sets of four beam control tiles $\mathbf{60}_1$ . . . $\mathbf{60}_{16}$ of the array 62.

Figure 21:
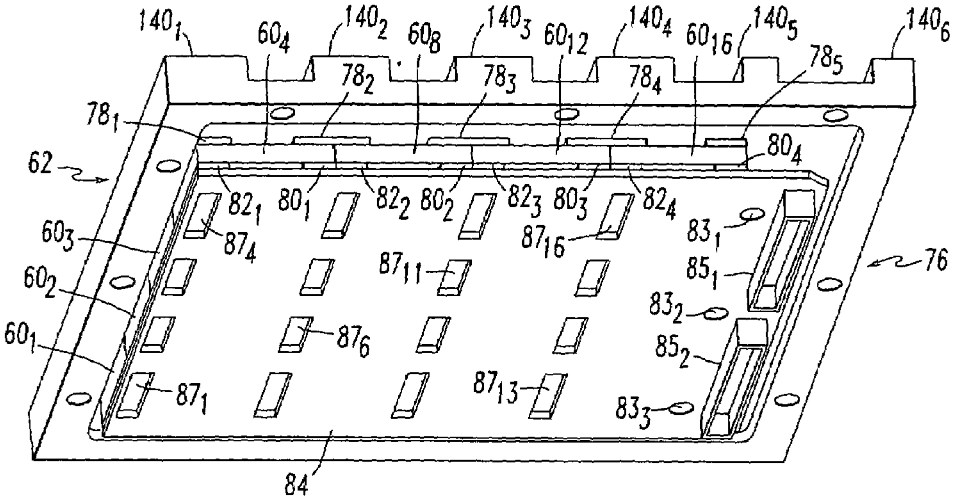
FIG. 21 is a perspective view of the underside of the assembly shown in FIG. 20, with a DC printed wiring board additionally secured thereto.
Figure 22:
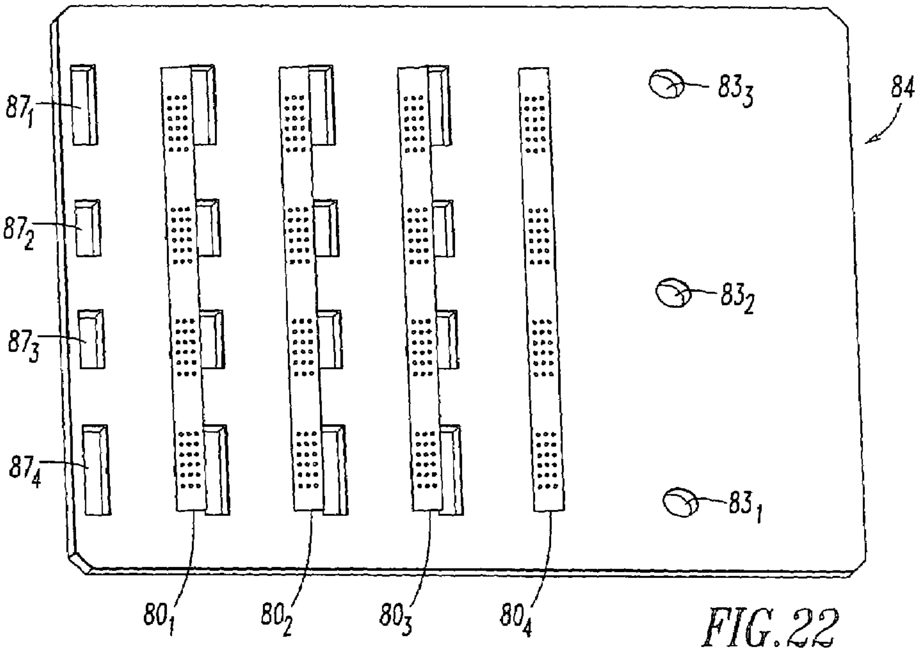
FIG. 22 is a plan view of one side of the DC wiring board shown in FIG. 21, with the fuzz button boards shown in FIG. 20 attached thereto.

FIG. 21 further shows the DC printed wiring board 84 covering the fuzz button boards $\mathbf{80}_1$ . . . $\mathbf{80}_4$ shown in FIG. 20. FIG. 21 additionally shows a pair of dual in-line pin connectors $\mathbf{85}_1$ and $\mathbf{85}_2$. FIG. 22 is illustrative of the underside of the DC wiring board 84 with the four fuzz button boards $\mathbf{80}_1$, $\mathbf{80}_2$, $\mathbf{80}_3$, and $\mathbf{80}_4$ shown in FIG. 20.

Figure 23:
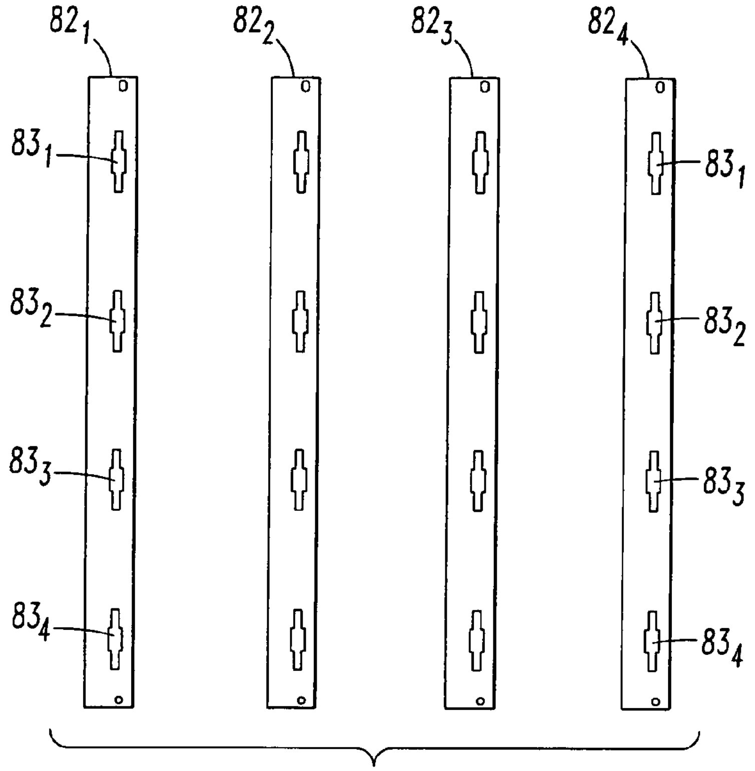
FIG. 23 is a plan view of a fourth set of four spring gasket members located between the array of beam control tiles and the DC printed wiring board shown in FIG. 21.
Figure 24:
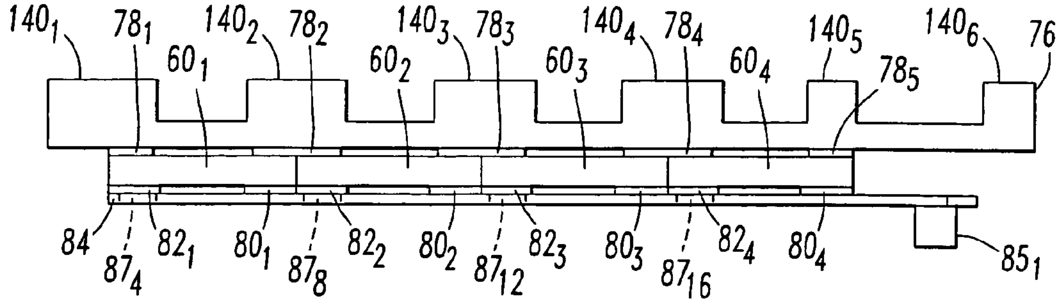
FIG. 24 is a longitudinal central cross-sectional view of the arrangement of components shown in FIG. 21.

Referring now to FIG. 23, shown thereat is the set of fourth BeCu spring gasket members $\mathbf{82}_1$, $\mathbf{82}_2$, $\mathbf{82}_3$, and $\mathbf{82}_4$ which are mounted coplanar and parallel with the fuzz button boards $\mathbf{80}_1$, $\mathbf{80}_2$, $\mathbf{80}_3$ and $\mathbf{80}_4$ shown in FIG. 20. Each of gasket members $\mathbf{82}_1$ . . . $\mathbf{82}_4$ include four rectangular openings $\mathbf{83}_1$ . . . $\mathbf{83}_4$ which are aligned with the four sets of rectangular openings $\mathbf{87}_1$, $\mathbf{87}_2$, $\mathbf{87}_3$, in the DC wiring board 84. A cross section of the sub-assembly of the components shown in FIGS. 21–23 is shown in FIG. 24.

Figure 25:
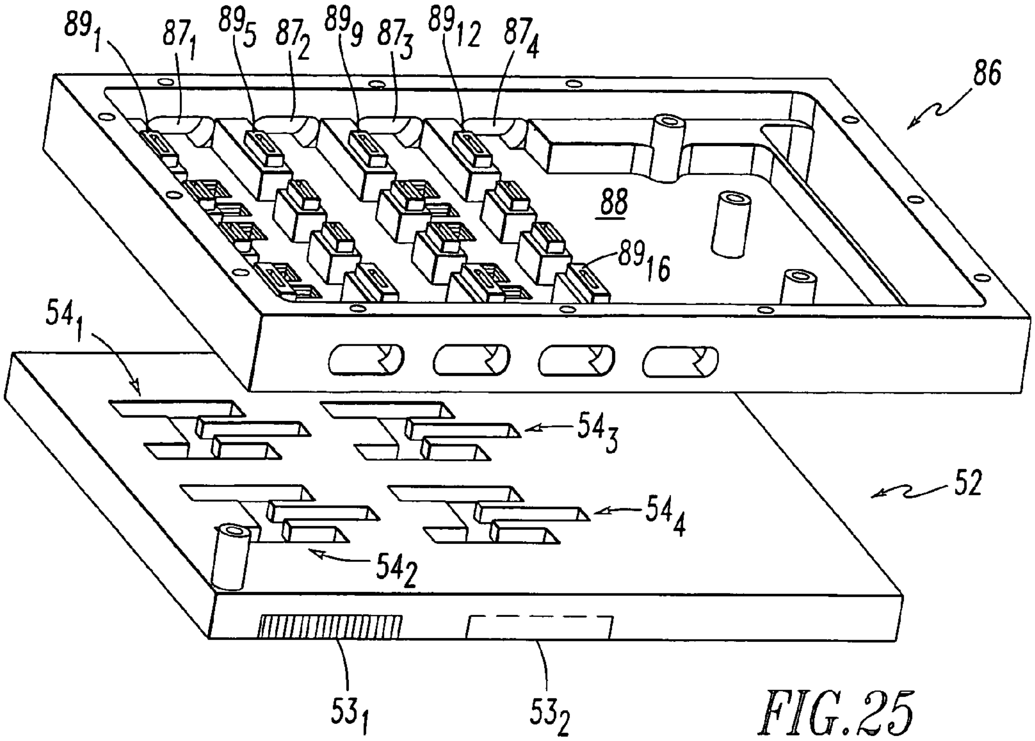
FIG. 25 is an exploded perspective view of a composite structure including an inner heat sink and an array RF manifold.
Figure 26:
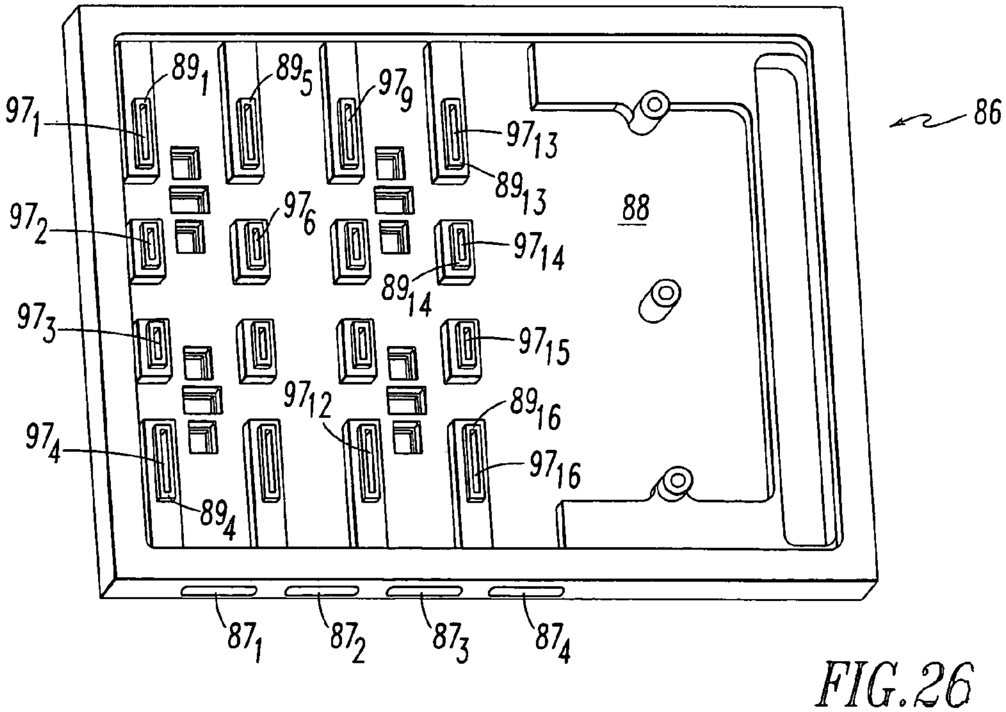
FIG. 26 is a top planar view of the inner heat sink shown in FIG. 25.

Mounted on the underside of the DC wiring board 84 is the inner heat sink member 86 which is shown in FIG. 25 together with the RF manifold 52 which is bonded thereto so as to form a unitary structure. The inner heat sink member 86 comprises a generally rectangular body member fabricated from aluminum and includes a cavity 88 with four cross ventilating air cooled channels $\mathbf{87}_1$. $\mathbf{87}_2$, $\mathbf{87}_3$ and $\mathbf{87}_4$ formed therein for cooling an array of sixteen outwardly facing dielectric waveguide to air waveguide transitions $89_1$ . . . $89_{16}$ as well as DC chips and components mounted on the wiring board 84 which are also shown in FIG. 26 which couple to the waveguides 238 (FIG. 14K) of the wave control tiles $60_1$ . . . $60_{16}$.

The details of one of the transitions 89 is shown in FIGS. 27A and 27B. The transitions 89 as shown include a dielectric waveguide to air waveguide RF input portion 91 which faces outwardly from the cavity 88 as shown in FIG. 25 and is comprised of a plurality of stepped air waveguide matching sections 93 up to an elongated relatively narrow RF output portion 95 including an output port 97. Output ports $97_1$ . . . $97_{16}$ for the sixteen transition $89_1$ . . . $89_{16}$ are shown in FIG. 26 and which couple to a respective backside dielectric waveguide 238 such as shown in FIG. 14K through spring gasket members 82 of the sixteen beam control tiles $60_1$ . . . $60_{16}$. Reference numerals 238 and 242 shown in FIGS. 27A and 27B respectively represent the waveguides and the stripline probes shown in FIG. 14I.

Figure 28:
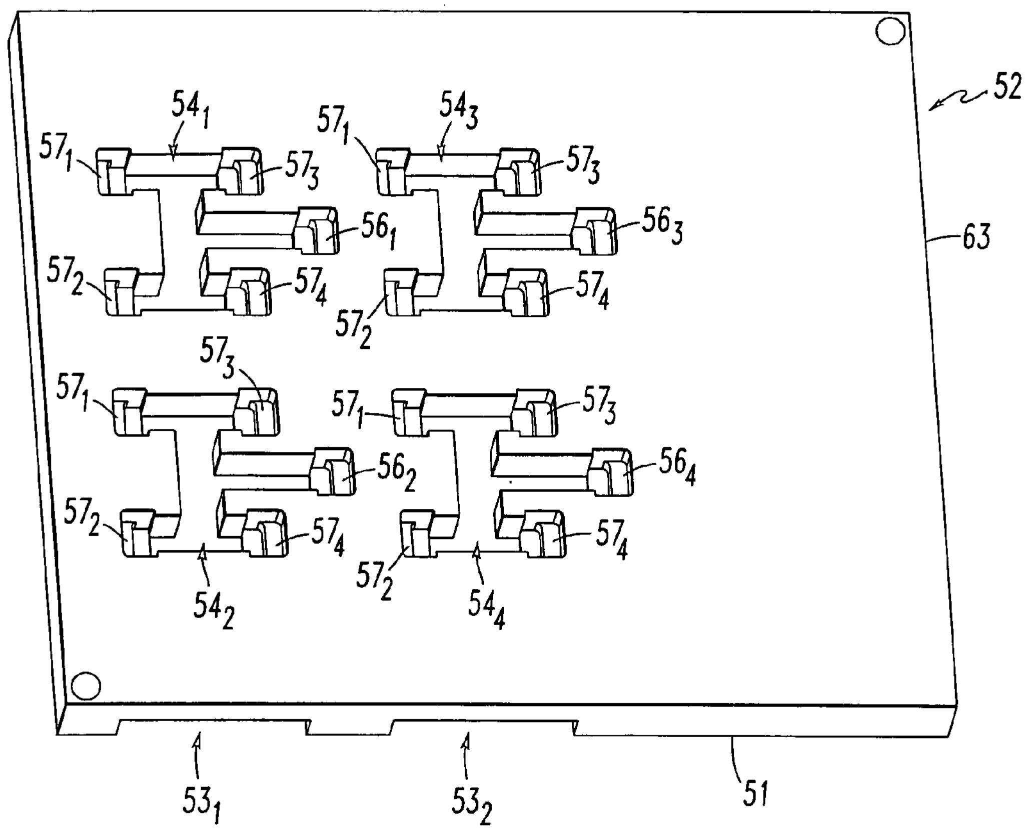
FIG. 28 is a top planar view of the inner face of the RF manifold shown in FIG. 25 including a set of four magic tee RF waveguide couplers formed therein.

Considering now the RF manifold section 52 referred to in FIG. 1, the details thereof are shown in FIGS. 25 and 28. The manifold 52 coincides in size with the inner heat sink member 86 and includes a generally rectangular body portion 51 formed of aluminum and which is machined to include two channels $53_1$ and $53_2$ formed in the underside thereof so as to pass air across the body portion 51 so as to provide cooling. As shown, the manifold member 52 includes four magic tee waveguide couplers $54_1$ . . . $54_4$, each having four arms $57_1$ . . . $57_4$ as shown in FIG. 28 coupled to RF signal ports $56_1$ . . . $56_4$ and which are fabricated in the top surface 63 so as to face the inner heat sink 52 as shown in FIG. 25. The RF signal ports $56_1$ . . . $56_4$ of the magic tee couplers $54_1$ . . . $54_4$ respectively couple to an RF input/output port 35 shown in FIG. 29 of a transceiver module 32 which comprises one of four transceiver modules $32_1$ . . . $32_4$ shown schematically in FIG. 1.

Figure 29:
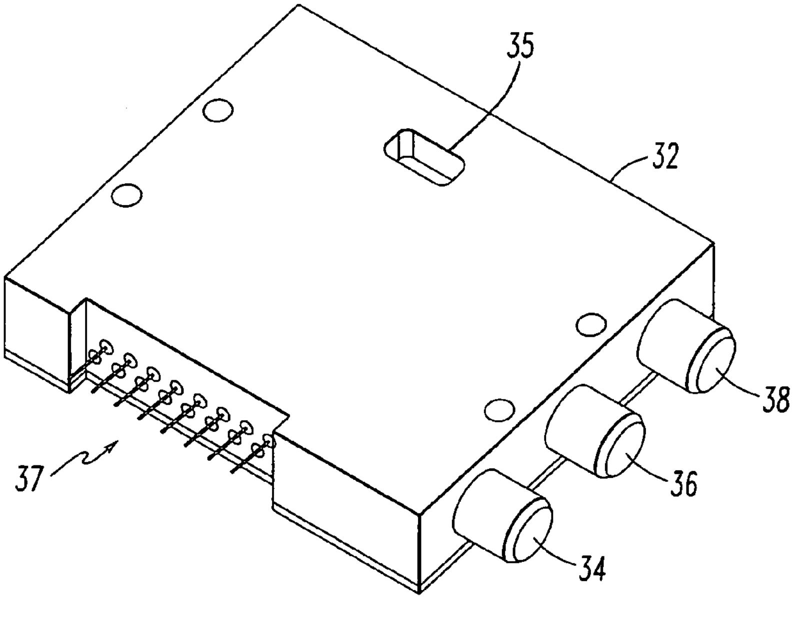
FIG. 29 is a perspective view of one of four transceiver modules affixed to the underside of the RF manifold shown in FIGS. 25 and 28.

The transceiver module 32 shown in FIG. 29 is also shown including terminals 34, 36 and 38, which couple to transmit, local oscillator and IF outputs shown in FIG. 1. Also, each transceiver module 32 includes a dual in-line pin DC connector 37 for the coupling of DC control signals thereto.

Accordingly, the antenna structure of the subject invention employs a planar forced air heat sink system including outer and inner heat sinks 76 and 86 which are embedded between electronic layers to dissipate heat generated by the heat sources included in the T/R cells, DC electrical components and the transceiver modules. Alternatively, the air channels $53_1$, $53_2$, and $87_1$, $87_2$, $87_3$, and $87_4$ included in the inner heat sink 86 and the waveguide manifold 52 could be filled with a thermally conductive filling to increase heat dissipation or could employ liquid cooling, if desired.

Having thus shown what is considered to be the preferred embodiment of the invention, it should be noted that the invention thus described may be varied in many ways. Such variations are not regarded as a departure from the spirit and scope of the invention, and all such modifications as would be obvious to one skilled in the art are intended to be included within the scope of the following claims.

What is claimed:

1. An active electronically scanned antenna (AESA) array for a phased array radar system, comprising:

a vertically integrated generally planar assembly including, at least one RF transceiver module having a plurality of signal ports including an RF input/output signal port;

beam control means coupled to said RF input/output signal port of said at least one transceiver module, said beam control means including a dielectric substrate having an arrangement of dielectric waveguide stripline and coaxial transmission line elements and vias designed to route RF signals to and from the transceiver module and a plurality of RF signal amplifier circuits coupled between a first RF waveguide formed in the substrate and terminating in an RF signal port in a rear face thereof, said RF signal port being coupled to the RF input/output signal port of the transceiver module, and a plurality of second RF waveguides also formed in said substrate and terminating in a respective plurality of waveguide ports having a predetermined port configuration in a front face thereof;

an antenna including a two dimensional array of regularly spaced antenna radiator elements having a predetermined spacing and orientation;

waveguide relocator means located between the beam control means and the antenna, said waveguide relocator means including a dielectric substrate having a plurality of waveguide ports formed therein located on a rear face thereof and being equal in number and having a port configuration matching the predetermined port configuration in the front face of said beam control means and a like plurality of waveguide ports formed therein on a front face thereof matching the spacing and orientation of the antenna radiator elements, said waveguide relocator means additionally including a plurality of waveguide transitions which selectively rotate and translate respective waveguides formed in the substrate which couple the waveguide ports on the rear face of the waveguide relocator means to the waveguide ports on the front face of the waveguide relocation means; and means for providing and ensuring waveguide interconnection between mutually facing waveguide ports and radiator elements of the vertically integrated assembly as well as preventing RF leakage therefrom.

2. The active antenna array according to claim 1 wherein said beam control means comprises a plurality of substantially identical beam control elements.

3. The active antenna array according to claim 2 wherein each beam control element of said plurality of beam control elements includes a branch signal coupler having a first branch coupled to said first RF waveguide formed in the substrate and a plurality of other branches coupled to one end of respective coaxial transmission lines having an opposite end coupled to an RF signal splitter connected to one end of said plurality of RF signal amplifier circuits located on one layer of said substrate, said RF signal amplifier circuits having respective opposite ends connected to said plurality of second RF waveguides formed in the substrate.

4. The active antenna array according to claim 3 wherein said branch signal coupler comprises a signal coupler fabricated in stripline on another layer of said substrate and wherein said coaxial transmission lines each include a center conductor and an outer conductor fabricated by a configuration of metallization and vias traversing multiple layers of said substrate between said one layer and said another layer.

5. The active antenna array according to claim 4 wherein said branch line coupler comprises a four line branch coupler and wherein one of said lines is coupled to said first RF waveguide, two of said lines are coupled to respective coaxial transmission line elements and one of said lines is coupled to a load comprising a tapered segment of resistive material.

6. The active antenna array according to claim 4 wherein the center conductor and outer conductor of said coaxial transmission lines are formed in a swept arcuate configuration in said multiple layers between said one layer and said another layer and additionally including a capacitive impedance matching element located on a layer adjacent said another layer.

7. The active antenna array according to claim 3 and additionally including microstrip to waveguide transition means coupled between the second T/R switch and said one waveguide.

8. The active antenna array according to claim 1 wherein said waveguide relocator means comprises a plurality of substantially identical waveguide relocator elements.

9. The active antenna array according to claim 8 wherein said plurality of waveguide transitions in said plurality of waveguide relocator elements include a plurality of mutually offset and incrementally rotated waveguide segments in a selected number of layers of the substrate.

10. The active antenna array according to claim 9 wherein the waveguide segments are rotated in predetermined angular increments.

11. The active antenna array according to claim 9 wherein the waveguide segments are rotated in equal angular increments.

12. The active antenna array according to claim 11 wherein the rotated segments provide a waveguide rotation of substantially 45°.

13. The active antenna array according to claim 9 wherein the offset segments are translated laterally in incremental steps.

14. The active antenna array according to claim 13 wherein a predetermined number of said waveguide transitions also includes an elongated intermediate segment between a selected number of offset segments and a selected number of rotated segments.

15. The active antenna array according to claim 1 wherein said beam control means comprise a plurality of multi-layer beam control tiles and wherein said waveguide relocator elements comprise a plurality of multi-layer waveguide relocator elements.

16. The active antenna array according to claim 1 wherein said at least one RF transceiver module comprises a plurality of transceiver modules, wherein said beam control means comprises a plurality of beam control elements, wherein said waveguide relocator means comprises a plurality of waveguide relocator elements, and wherein said means for providing waveguide interconnection comprises waveguide flange members located between the beam control elements and the waveguide elements.

17. The active antenna array according to claim 16 wherein said plurality of waveguide relocator elements comprises sub-panel sections of a common waveguide relocator panel.

18. The active antenna array according to claim 17 wherein said at least one RF transceiver module comprises four transceiver modules, wherein said beam control means comprises sixteen beam control elements, four beam control elements for each of said four transceiver modules, and wherein said waveguide relocator means comprises sixteen waveguide relocator elements, one waveguide relocator element for each one of said beam control elements.

19. The active antenna array according to claim 18 wherein the antenna elements of the antenna are formed in a faceplate and each of said beam control tiles includes sixteen RF signal amplifier circuits and sixteen second RF waveguides terminating in sixteen waveguide ports on the front face thereof, and wherein said waveguide relocator elements comprise sub-panel sections of a common waveguide relocator panel includes sixteen waveguide ports on both the front and rear faces thereof, the front face of the relocator sub-panel sections facing a rear face of the faceplate of the antenna and rear face of the relocator panel facing the front face of the beam control elements.

20. The active antenna array according to claim 19 where said two dimensional array of radiator elements comprises a grid of sixty four antenna elements respectively coupled to said waveguide relocator panel.

21. The active antenna array according to claim 20 wherein said radiator elements comprise respective elongated slots including waveguide to air transition means arranged in a grid on said faceplate.

22. The active antenna array according to claim 21 wherein said faceplate is comprised of a substantially flat metal plate including an inner layer of foam material and an outer layer of waveguide to air interface matching material located thereon.

23. The active antenna array according to claim 19 wherein said predetermined port configuration of said beam control tiles comprises a predetermined number of waveguide ports selectively located adjacent a pair of opposing side edges of the front face thereof and wherein the plurality of RF signal amplifier circuits are located between said waveguide ports.

24. The active antenna array according to claim 23 wherein said plurality of waveguide ports located adjacent said pair of side edges are linearly arranged in two sets of generally parallel lines of waveguide ports on the front face of the beam control tiles.

25. The active antenna array according to claim 17 wherein said plurality of beam control tiles are arranged side-by-side in a generally planar array and further comprising outer heat sink means and inner heat sink means located on opposite sides thereof.

26. The active antenna array according to claim 25 wherein said outer heat sink means is located between the array of beam control tiles and the waveguide relocator panel.

27. The active antenna array according to claim 26 wherein said outer heat sink means and said inner heat sink member comprises generally planar outer and inner air cooled sink members.

28. The active antenna array according to claim 27 wherein said outer heat sink member includes a plurality of waveguides formed therethrough for coupling the waveguide ports in the front face of the beam control tiles to the waveguide ports in the back face of the waveguide relocator panel.

29. The active antenna array according to claim 28 wherein said inner heat sink member includes RF coupling means and a plurality of waveguide ports for coupling said input/output signal port of said transceiver module to a predetermined number of said beam control tiles.

30. The active antenna array according to claim 29 and further comprising means located between the plurality of beam control tiles and the inner heat sink member for powering and controlling the plurality of RF signal amplifier circuits in the beam control tiles.

31. The active antenna array according to claim 29 wherein said means for powering and controlling the RF signal amplifier circuits comprise a DC power control board including solderless interconnects for controlling active electronic circuit components in the RF signal amplifier circuits and a plurality of openings therein for enabling the coupling of the plurality of the waveguide ports in the inner heat sink member to the single RF signal port in the rear face of the beam control tiles.

32. The active antenna array according to claim 31 wherein the RF coupling means in said inner heat sink member includes dielectric waveguide to air waveguide transition means.

33. The active antenna array according to claim 32 wherein said dielectric waveguide to air waveguide means include a relatively wide outwardly facing RF signal input portion and a plurality of intermediate stepped air waveguide matching portions terminating in a relatively narrow output portion including an output port.

34. The active antenna array according to claim 33 wherein each of said RF signal amplifier circuits comprises a transmit/receive (T/R) circuit including a controllable multi-bit RF signal phase shifter coupled to said signal splitter, a first T/R switch coupled to the phase shifter, a second T/R switch coupled to one waveguide of said plurality of second RF waveguides, and a transmit RF amplifier circuit and a receive RF amplifier circuit each including one or more amplifier stages connected between the first and second T/R switches.

35. The active antenna array according to claim 34 wherein said multi-bit phase shifter comprises a three bit stripline phase shifter.

36. The active antenna array according to claim 34 wherein said one or more amplifier stages comprises three amplifier stages.

37. The active antenna array according to claim 36 wherein said three amplifier stages comprise amplifier circuits including one or more semiconductor amplifier devices.

38. The active antenna array according to claim 32 wherein the RF coupling means comprise a multi-arm coupler formed in an RF signal manifold body portion of said inner heat sink member.

39. The active antenna array according to claim 29 wherein said means for providing waveguide interconnection comprises first waveguide flange means located between the antenna faceplate and the front face of the waveguide relocator tiles, second waveguide flange means located between the rear face of the waveguide relocator panel and a front face of the outer heat sink member, third waveguide flange means located between a rear face of the outer heat sink and the front face of the beam control tiles, and fourth RF leakage prevention means located between the rear face of the beam control tiles and waveguide ports of the inner heat sink means.

40. The active antenna array according to claim 39 wherein said waveguide flange means comprises generally flat metal spring gasket members.

41. The active antenna array according to claim 40 wherein said spring gasket members include a plurality of elongated holes for enabling the passage of RF energy therethrough and having compressible fingers on inner edges thereof for providing a spring effect.

42. Apparatus for interconnecting signals in an RF antenna assembly of a radar system, comprising:

a beam control tile including, a plurality of contiguous layers of dielectric material having front and rear faces and including a predetermined arrangement of dielectric waveguides, stripline and coaxial transmission line elements and conductive vias for implementing the routing RF signals between one or more RF signal ports located in said front and rear faces; and, a plurality of RF signal amplifier circuits coupled at one end to a first RF waveguide formed in a substrate comprised of a plurality of layers of laminate material and terminating in at least one RF signal port in one of said faces and at the other end to a plurality of second RF waveguides also formed in a predetermined number of said plurality of layers of laminate material and terminating in respective RF signal ports in the other face of said faces.

43. The apparatus according to claim 42 wherein the laminate material comprises material selected from a group of materials including low temperature co-fired ceramic (LTCC) material and high-temperature co-fired ceramic (HTCC) material.

44. The apparatus according to claim 42 wherein said second RF waveguides are located in opposing outer side portions of the substrate and wherein said plurality of RF signal amplifier circuits are located in a region between said second RF waveguides.

45. The apparatus according to claim 44 wherein said plurality of RF signal amplifier circuits are located on a common layer of said substrate.

46. The apparatus according to claim 44 wherein said beam control tile additionally includes a branch signal coupler having a first branch coupled to said first RF waveguide and a plurality of other branches coupled to one end of respective RF transmission lines having an opposite end coupled to an RF signal splitter connected to one end of said plurality of RF signal amplifier circuits located on one layer of said substrate, said RF signal amplifier circuits having respective opposite ends connected to said plurality of second RF waveguides.

47. The apparatus according to claim 46 wherein said RF transmission lines comprise coaxial transmission lines each including a center conductor and an outer conductor fabricated by a configuration of metallizations and vias traversing multiple layers of said substrate and formed in an arcuate arrangement between said one layer and said another layer and a capacitive impedance matching member located on a predetermined said substrate.

48. The apparatus according to claim 47 wherein said branch signal coupler comprises a signal coupler fabricated in stripline on another layer of said substrate and comprises a four line branch coupler and wherein one of said lines is coupled to said first RF waveguide, two of said lines are coupled to a respective coaxial transmission line element and one of said lines is coupled to a load.

49. The apparatus according to claim 48 wherein said load comprises a tapered segment of resistive material.

50. The apparatus according to claim 48 wherein each of said plurality of signal amplifier circuits comprise transmit/receive (T/R) circuits.

51. The apparatus according to claim 50 wherein each of said T/R circuits include a controllable multi-bit RF signal phase shifter coupled to said signal splitter, a first T/R switch coupled to the phase shifter, a second T/R switch coupled to one waveguide of said plurality of second RF waveguides, and a transmit RF amplifier circuit and a receive RF amplifier circuit each including one or more amplifier stages connected between the first and second T/R switches.

52. Apparatus for interconnecting signals in an RF antenna assembly of a radar system, comprising:

waveguide relocator means including, a substrate including a plurality of waveguide ports located on a rear face thereof having a first multiple port configuration;

a like plurality of waveguide ports located on a front face having a second multiple port configuration; and, a like plurality of waveguide transitions selectively coupling said waveguide ports of said first port configuration on said rear face to said waveguide ports of said second port configuration on said front face.

53. The apparatus according to claim 52 wherein said substrate is comprised of laminate material selected from a group of laminate materials including a diffusion bonded copper laminate material, low temperature co-fired ceramic (LTCC) material and high-temperature co-fired (HTCC) material.

54. The apparatus according to claim 52 wherein said substrate is comprised of a diffusion bonded copper laminate stack-up with dielectric filling.

55. The apparatus according to claim 54 wherein said waveguide transitions selectively rotate and translate waveguides formed in the substrate so as to couple the waveguide ports of the first configuration on said rear face to respective waveguide ports of the second configuration on said front face, and wherein said first port configuration comprises a first plurality of ports arranged in a rectangular array on said front face and said second port configuration comprises a second plurality of ports located on opposing side portions of said rear face.

56. The apparatus according to claim 55 wherein one half of said second plurality of ports are respectively located on opposing side portions of said rear face.

57. The apparatus according to claim 56 wherein each said half of said second plurality of ports are linearly arranged on said rear face.

58. The apparatus according to claim 57 wherein said second plurality of ports are arranged in opposing pairs of parallel linear sets of ports.

59. The apparatus according to claim 58 wherein said plurality of waveguide transitions in said plurality of waveguide relocator elements include a plurality of mutually offset and incrementally rotated waveguide segments in a selected number of layers of the substrate.

60. The apparatus according to claim 59 wherein the waveguide segments are rotated in predetermined angular increments.

61. The apparatus according to claim 60 wherein the waveguide segments are rotated in equal angular increments.

62. The apparatus according to claim 60 wherein the rotated segments provide a waveguide rotation of substantially 450 between the front and rear faces.

63. The apparatus according to claim 62 wherein the offset segments are translated laterally in incremental steps.

64. The apparatus according to claim 63 wherein a predetermined number of said waveguide transitions also includes an elongated intermediate segments between a selected number of offset segments and a selected number of rotated segments.

65. The apparatus according to claim 64 wherein the waveguide relocator means comprises a plurality of like relocator elements comprising sub-panel sections of a common waveguide relocator panel.

66. A method of transmitting and receiving Ka-band RF signals, comprising the steps of:

coupling an RF input/output signal port of at least one RF transceiver module to beam control means of an active electronically scanned antenna;

routing RF signals to and from the transceiver module and a plurality of RF signal amplifier circuits in the beam control means via a first RF waveguide terminating in an RF signal port formed in a rear face thereof, and a plurality of second RF waveguides terminating in a respective plurality of waveguide ports having a predetermined port configuration formed in a front face thereof;

locating waveguide relocator means between the beam control means and an antenna including a two dimensional array of regularly spaced antenna radiator elements having a predetermined spacing and orientation;

coupling the plurality of waveguide ports on the front face of the beam control means to a plurality of waveguide ports located on a rear face of the waveguide relocator means and being equal in number and having a port configuration matching the predetermined port configuration in the front face of said beam control means, the waveguide relocator means having a like plurality of waveguide ports formed on a front face thereof matching the spacing and orientation of the antenna radiator elements, a plurality of waveguide transitions which selectively rotate and translate respective waveguides coupling the waveguide ports on the rear face of the waveguide relocator means to the waveguide ports on the front face of the waveguide relocation means; and providing interconnection and preventing RF leakage between mutually coupled signal ports of the beam control means and the waveguide relocator means via gasket means.

67. The method according to claim 66 wherein said beam control means comprises a plurality of substantially identical beam control tiles.

68. The method of according to claim 66 wherein said waveguide relocator means comprises a plurality of substantially identical waveguide relocator elements.

69. The method according to claim 68 wherein said plurality of waveguide means comprises a waveguide relocator panel including a plurality of like sub-sections.

70. The method according to claim 66 and additionally including the step of fabricating the first RF waveguide in a substrate so as to terminate in the RF signal port in the rear face of the beam control means and fabricating the plurality of second RF waveguides in the front face of the beam control means.

71. The method according to claim 66 and additionally including the step of fabricating the plurality of waveguides and waveguide transitions in a substrate and coupling the waveguide ports on the rear face of the waveguide relocator means to the waveguide ports on the front face of the waveguide relocator means.

72. The apparatus according to claim 66 wherein said at least one RF transceiver module comprises four transceiver modules, wherein said beam control means comprises sixteen beam control tiles, four beam control tiles for each of said four transceiver modules, and wherein said waveguide relocator means comprises a waveguide relocator panel including sixteen waveguide relocator sub-panel sections, one waveguide relocator sub-panel section for each one of said beam control tiles.

* * * * *

UNITED STATES PATENT AND TRADEMARK OFFICE

CERTIFICATE OF CORRECTION

PATENT NO. : 6,975,267 B2
APPLICATION NO. : 10/358278
DATED : December 13, 2005
INVENTOR(S) : Peter A. Stenger et al.

It is certified that error appears in the above-identified patent and that said Letters Patent is hereby corrected as shown below:

Col. 18, Claim 72, line 1, change "apparatus" to --method--.

Signed and Sealed this

Ninth Day of January, 2007

JON W. DUDAS

*Director of the United States Patent and Trademark Office*